US008841789B2

(12) United States Patent  
Andujar

(10) Patent No.: US 8,841,789 B2
(45) Date of Patent: Sep. 23, 2014

(54) HYBRID ELECTRO MAGNETIC HYDRO KINETIC HIGH PRESSURE PROPULSION GENERATOR

(71) Applicant: Juan Andujar, San Juan, PR (US)

(72) Inventor: Juan Andujar, San Juan, PR (US)

(*) Notice: Subject to any disclaimer, the term of this patent is extended or adjusted under 35 U.S.C. 154(b) by 101 days.

(21) Appl. No.: 13/662,977

(22) Filed: Oct. 29, 2012

(65) Prior Publication Data

US 2013/0106106 A1    May 2, 2013

Related U.S. Application Data

(60) Provisional application No. 61/552,833, filed on Oct. 28, 2011.

(51) Int. Cl.
F03B 13/00     (2006.01)

(52) U.S. Cl.
CPC .................................... F03B 13/00 (2013.01)
USPC ............................................. 290/43; 290/54

(58) Field of Classification Search
USPC ........................................ 290/43, 54, 52, 1 R
See application file for complete search history.

(56) References Cited

U.S. PATENT DOCUMENTS

| 4,058,979 | A  | * | 11/1977 | Germain | ........................ 60/327 |
| 8,664,785 | B2 | * | 3/2014  | Madison | ........................ 290/43 |
| 2008/0122226 | A1 | * | 5/2008 | Madison | ........................ 290/52 |
| 2011/0084494 | A1 |   | 4/2011 | Andujar |   |
| 2012/0079825 | A1 | * | 4/2012 | Harif   | ............................. 60/645 |

* cited by examiner

Primary Examiner — Tho D Ta
(74) Attorney, Agent, or Firm — James Ray & Assoc

(57) ABSTRACT

An apparatus includes an electro-magnetic metallurgy high powered electric energy density push-repel two stage magnetic stack cylinder drive motor and a hydro-kinetic high pressure hydraulic and nitrogen gas piston drive pump propulsion motor arrangement. A linear electric generator can be coupled to the arrangement to generate electric energy or the output shaft may be provided for propulsion uses.

11 Claims, 14 Drawing Sheets

40 DynoE units of 1MW each, 5MW are used to power
the Chemical Manufacturing Plant & the remaining 35MW are sold to the National Grid Apparatus 10        Home        the Grid

HYBRID ELECTRO MAGNETIC HYDRO KINETIC HIGH PRESSURE PROPULSION GENERATOR

CROSS-REFERENCE TO RELATED APPLICATIONS

This application is related to and claims priority from U.S. Provisional Patent Application Ser. No. 61/552,833 filed on Oct. 28, 2011.

FIELD OF THE INVENTION

The instant invention relates, in general, to an electro-magnetic metallurgy high powered electric energy density push-repel two stage magnetic stack cylinder drive motor and a hydro-kinetic High Pressure hydraulic and nitrogen gas piston drive pump propulsion motor system, and more particularly, this invention relates to a hybrid magnetically levitated AC electric generator with an independent high powered magnetic translator stack.

STATEMENT REGARDING FEDERALLY SPONSORED RESEARCH AND DEVELOPMENT

N/A

REFERENCE TO SEQUENCE LISTING, A TABLE, OR A COMPUTER PROGRAM LISTING COMPACT DISC APPENDIX

N/A

BACKGROUND OF THE INVENTION

With rising costs of electrical energy produced from by burning fossil fuels, efforts have been made to use wind power to produce electricity. However, predicting wind availability where and when and for how long is not yet generally possible. Furthermore, the strength of the wind in not constant and it varies from zero to storm force. This means that wind turbines do not produce the same amount of electricity all the time, and there will be times when they produce no electricity at all. Therefore, there is a need for an alternative technology to generate electrical energy.

OBJECTS OF THE INVENTION

It is, therefore, one of the primary objects of the present invention to provide a hybrid electro-magnetic hydro kinetic high pressure propulsion drive system and magnetically levitated non-intermittent electric generator.

Another object of the present invention to provide a magnetically levitated non-intermittent generator with a hydraulic and nitrogen gas high pressure accumulator and reservoir tank that makes the need for batteries or an inverter unnecessary for continuous operation.

It is another object of the present invention to provide a magnetically levitated non-intermittent generator that can be used 24/7 365 of the year without the need for wind or sun.

A further object of the present invention to provide a hybrid electro-magnetic hydro kinetic high pressure propulsion drive system and magnetically levitated non-intermittent generator that uses pre-pressurized to 2,000 PSI hydraulic and pre-pressurized to 5,000 PSI nitrogen gas accumulator reservoirs.

Yet a further object of the present invention to provide a hybrid electro-magnetic hydro kinetic high pressure propulsion drive system and magnetically levitated non-intermittent generator that uses electro metallurgy high density super energy storage ultra-capacitors of high technology, shunting electric power to a hybrid synergy drive gearbox, moreover providing additional power when required to maintain the system running and/or help kick start the unit, if and when required, aided by a computer implemented software solution.

Another object of the present invention to provide a hybrid electro-magnetic hydro kinetic high pressure propulsion drive system and magnetically levitated non-intermittent generator that uses two small off the shelf 1.5 kw to 5 kw pancake shop generators or larger depending on the kw size of the machine required, these two small generators are connected to the bottom and atop (both ends) of the magnet cylinder drive stack, generating electricity as the cylinder drive stack spins.

Yet another object of the present invention to provide a hybrid electro-magnetic hydro kinetic high pressure propulsion drive system and magnetically levitated non-intermittent generator that uses a hydro kinetic hydraulic propulsion turbine wheel.

In addition to the various objects and advantages of the present invention described with some degree of specificity above it should be obvious that additional objects and advantages of the present invention will become more readily apparent to those persons who are skilled in the relevant art from the following more detailed description of the invention, particularly, when such description is taken in conjunction with the attached drawing figures.

SUMMARY OF THE INVENTION

The present invention with its two stage electro-magnetic high pressure energy density cylinder stack drive generator stack and its pre-pressurized high pressure hydraulic tank to 2,000 PSI and nitrogen gas accumulator reservoir tanks of 5,000 PSI together with its high pressure hydraulic and nitrogen gas piston pump propulsion drive unit used to propel the hydro kinetic turbine or hydraulic pump drive unit used in starting and running an vertical axis magnetically levitated AC generator are the key elements within the device's economic performance and is considered by wind energy experts as a significant leap to commercialization Leapfrogging the traditional wind turbine.

The present invention is an anywhere anytime electro-magnetic high powered electric energy density push and repel magnetic cylinder stack drive generator motor and high electric energy storage devices in tandem with a hydro kinetic high pressure hydraulic and nitrogen gas high pressure propulsion drive generating solution with distinct advantages over conventional horizontal and vertical axis wind turbines with low cost global deployment better operational performance and greater environmental advantages.

Figure 1:
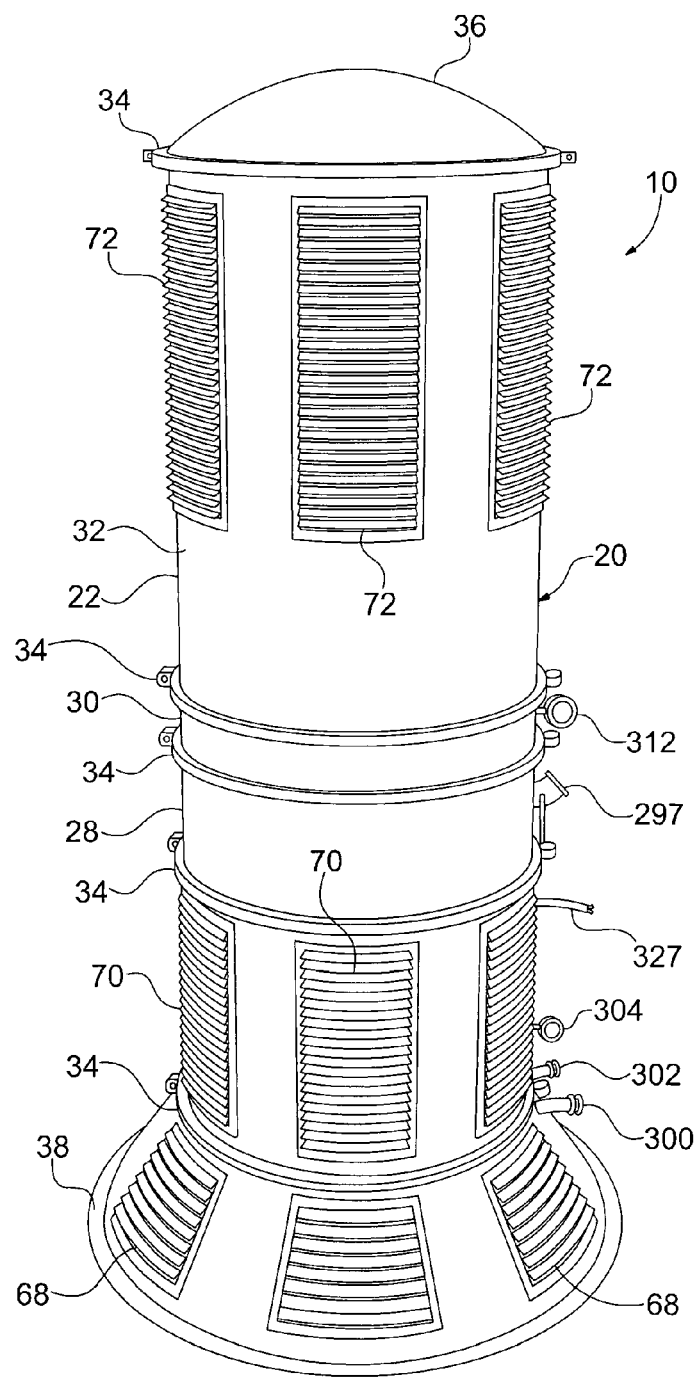
FIG. 1 is a 3-D view of an apparatus of the instant invention configured to generate electric energy.

BRIEF DESCRIPTION OF A PRESENTLY PREFERRED AND VARIOUS ALTERNATIVE EMBODIMENTS OF THE INVENTION

Prior to proceeding to the more detailed description of the present invention, it should be noted that, for the sake of clarity and understanding, identical components which have identical functions have been identified with identical reference numerals throughout the several views illustrated in the drawing figures.

Now in reference to FIGS. 1-5, therein is illustrated an apparatus, generally designated as 10, configured to generate electric energy. Apparatus 10 includes a housing, generally designated as 20. The housing 20 has a peripheral side wall 22 defining hollow interior 24. The peripheral side wall 22 may be provided as a unitary member, but preferably includes a plurality of sections 26, 28, 30 and 32 disposed in series with each other. There is also plurality of ring shaped clamping members 34, each configured to join adjacent ends of a pair of section of the peripheral side wall 22. Preferably, each ring shaped clamping members 34 is of a quick release type with integrated rubber sealing O-rings. A top portion 36 closes one or upper end of the peripheral side wall 22 and a bottom portion 38 closes another or lower end of the peripheral side wall 22. The bottom portion 38 preferably has a fustoconical shape. Additional clamping members 34 are employed to joining the top and bottom portions to a respective section of the peripheral side wall 22.

There is also a plurality of plate shaped members 40, 42, 44, 46, 48, 50 and 52 that are disposed in a spaced apart relationship with each other along the longitudinal axis of the housing 20 and dividing the hollow interior 24 into a plurality of chambers 54, 56, 58, 60, 62 and 64. Each of the plurality of plate shaped members 40, 42, 44, 46, 48, 50 and 52 is aligned with a respective one of the plurality of clamping members 34, wherein the peripheral edges of such plate shaped members 40, 42, 44, 46, 48, 50 and 52 may provide a portion of such clamping members 34.

Each of the peripheral side wall 22 and bottom portion 38 includes louvers 68, 70, and 72 or other like provisions so as to vent the hollow interior 24.

Figure 2:
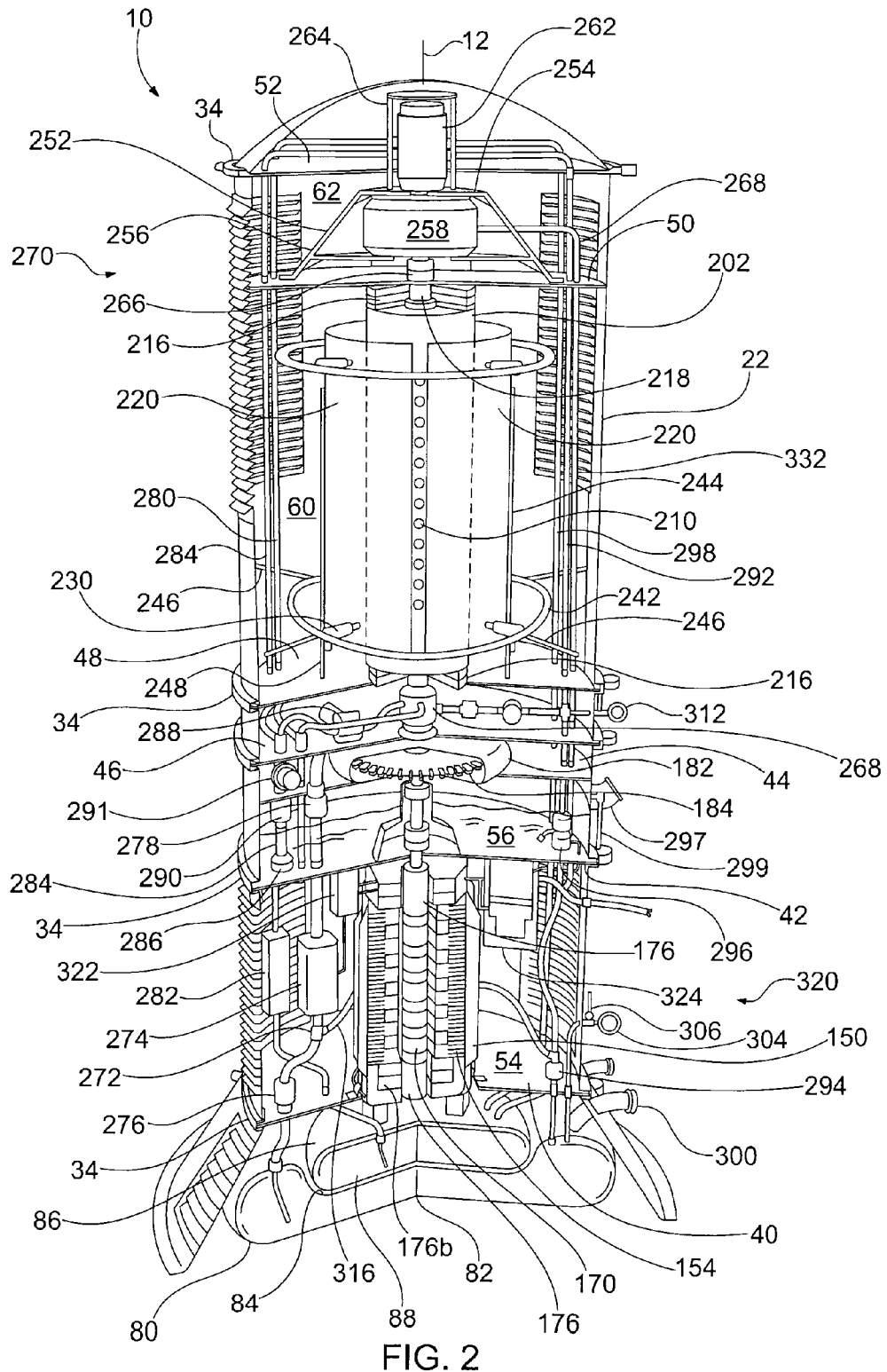
FIG. 2 is a cutaway view of the apparatus of FIG. 1.
Figure 3:
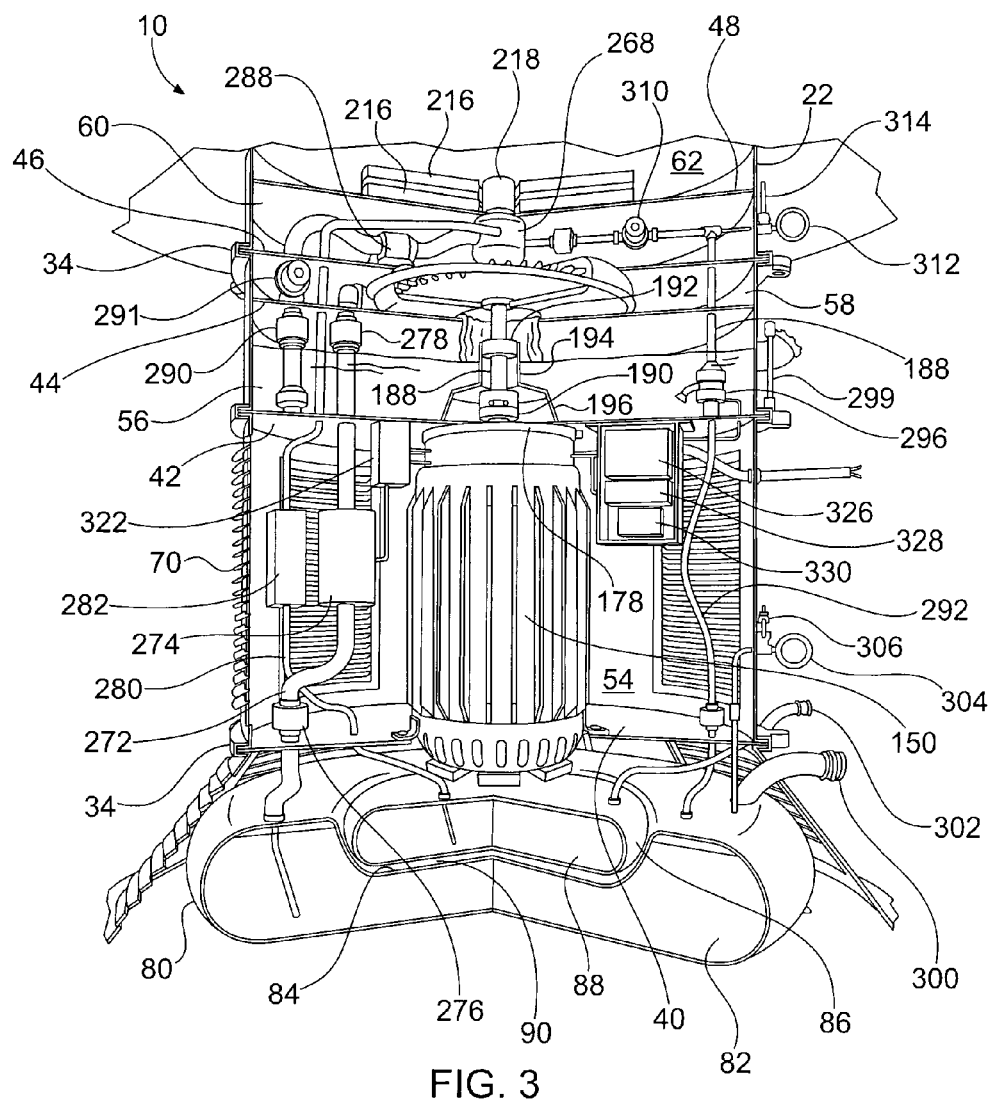
FIG. 3 is one partial enlarged view of the apparatus of FIG. 2, particularly illustrating a linear electric generator.
Figure 4:
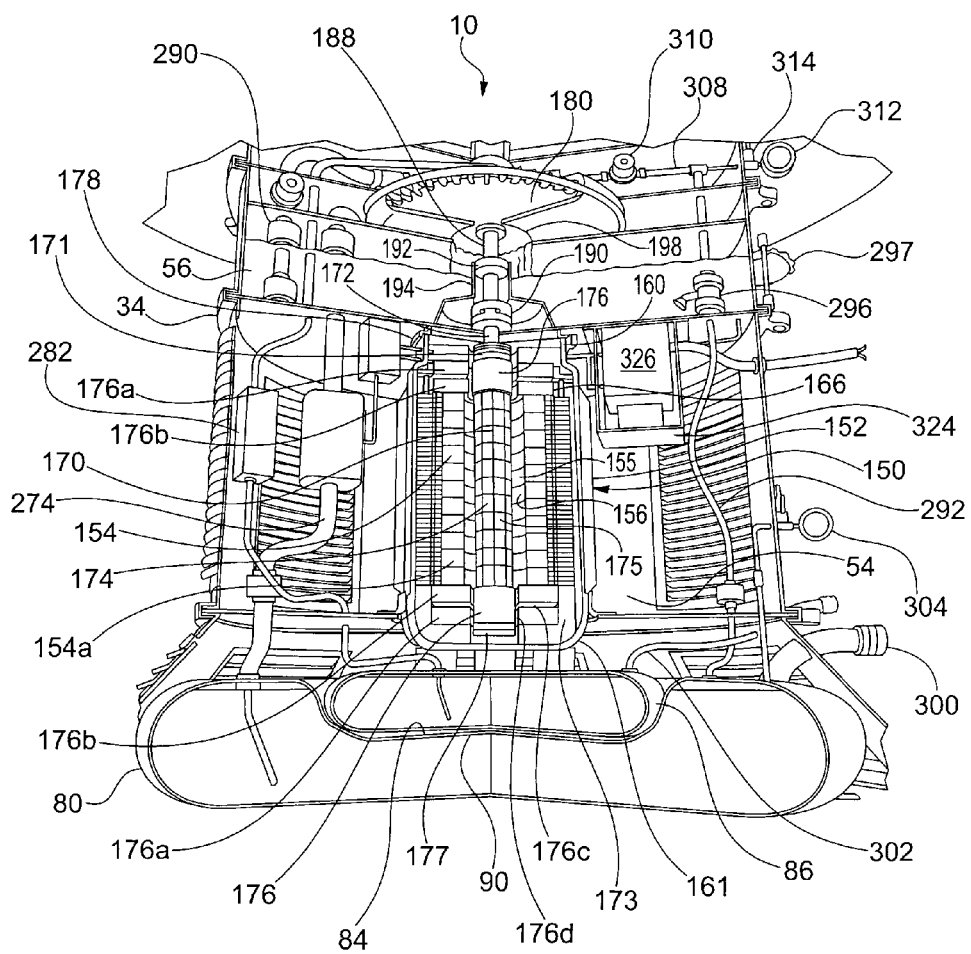
FIG. 4 is another cutaway view of the apparatus of FIG. 1, particularly illustrating internal structure of the linear electric generator of FIG. 3.

In further reference to FIGS. 2-4, the apparatus 10 includes a first reservoir 80 mounted axially within a hollow interior of the bottom portion 38. The first reservoir 80 is configured to contain a first pre-pressurized fluid 82 therein, such first fluid 82 being a hydraulic oil, but also capable of being air or water.

A second reservoir 86 is also mounted axially within the hollow interior of the bottom portion 38. The second reservoir 86 is configured to contain a second pre-pressurized fluid 88 therein, such second fluid 88 being nitrogen gas. The instant invention needs a smaller amount of nitrogen 88 than the hydraulic oil 82 and, thus, the second reservoir 86 is smaller in volume than the first reservoir 80. Furthermore, the upper surface of the first reservoir 80 is provided with a cavity 84 sized to receive the second reservoir 86 therewithin. An insulating pad 90, preferably manufactured from an elastomeric material, such as rubber, is disposed between the bottom surface of the second reservoir 86 and the surface of the cavity 84. As it will be explained later, each reservoir 80, 86 includes connections for inlet and outlet conduits.

The apparatus 10 further contains a linear generator, generally designated as 150, which is mounted above the first and second reservoirs, 80 and 86 respectively, in a first chamber 54 defined by a pair of the plate shaped members 40 and 42. The linear generator 150 includes an elongated hollow generator housing 152 having a round tubular cross-section in a plane transverse to its length. The top end of the generator housing 152 is closed by a first end member 160 which is attached to the plate shape member 40, preferably with a quick release ring 178. The bottom end of the generator housing 152 is closed by a second end member 161. A rotor 154 is mounted within the hollow housing 152. Rotor 154 essentially comprises at least one stack of coil winding 154a, each having a doughnut like cross-section in a plane transverse to the length of the rotor 154. A stator 170 is also provided and is disposed within the inner chamber formed by the peripheral inner surface 156 of the rotor 154 so that a magnetic flux air gap 155 is provided between the inner surface 156 of the rotor 154 and the outer peripheral surface of the stator 170. The stator 170 includes a shaft 172 and a predetermined plurality of annular magnets 174 mounted on the shaft 172 for rotation therewith. A pair of adjacent magnets 174 may be separated by a spacer 175. The shaft 172 is supported for rotation within the generator housing 152. The instant invention takes advantage of magnetic bearing arrangement, thus providing a substantially smooth effortless and friction free alternating circular motion of the stator 170 within the generator housing 152. More particularly, the shaft 172 includes a pair of annular collars 176, each secured to the peripheral surface of the shaft 172 for rotation therewith and a pair of bearings 176a and 176b mounted in tandem and forming a magnetic flux air gap 176c between opposed respective ends thereof. Ends 171 and 177 are also provided adjacent a respective collar. There is another magnetic air flux gap 176d that is formed between the inner peripheral surface of each bearing 176a, 176b and the outer peripheral surface of the collar 176. One bearing, shown as 176a is securely mounted, by way of an epoxy, within a cavity 166 provided within each end member 160, 161, while the other bearing 176b is securely mounted, for example by way of epoxy, within a bearing housing 173 stationary disposed within the generator housing 152 in spaced relationship with a respective end 160, 161 thereof.

The resulting effect of such bearings 176a, 176b and collar 176 is that the rotor 170 is rotated in a full 360-degree rotation manner and runs in a substantially stable and consistent manner. Thus, the stator shaft 172 rotates with minimal friction or no friction at all. Advantageously, the cavity 166 housing the upper bearing 176a maintains substantially original shape through the life of the system 20 void any irregular or oval shapes associated with conventional motors. Furthermore, since the shaft 172 rotates with minimal friction or no friction at all, less energy and/or momentum is required to start the rotation.

Full 360-degree rotation of the stator 170 ensures substantially evenly distributed force of attraction and aids in maintaining balance of the stator 170 during operation thus avoiding shuddering or instability generally associated with conventional rotors.

Furthermore, since resistance to friction is essentially eliminated, the electric generator 150 is characterized by an increased output.

Finally, since bearings 176a, 176b are contemplated as friction-free as well as lubrication-free, they are advantageous to withstand environmental temperature fluctuations.

Another element of the apparatus 10 is a turbine assembly, generally designated as 180, that includes a hollow turbine housing 182 mounted on another plate shaped member 44, a hydro-kinetic turbine 184 mounted within the turbine housing 182 above the linear generator 150, a plurality of jets 186 defined within the hydro-kinetic turbine 184, and a turbine shaft 188 having one end thereof extending downwardly from one end of the turbine housing 182.

The shaft 188 and the shaft 172 of the linear generator 150 are coupled together with a conventional coupling 190. Positioned above the coupling 190 is another bearing 192. Both the coupling 190 and the bearing 192 are encased within the funnel shaped housing 194 having a wider open end 196 attached to the plate shaped member 42 positioned in close proximity to the top member 160 of the linear generator 150. The funnel shaped housing 194 is so configured that it directs the hydraulic fluid discharge from the hydro-kinetic turbine 184 through the aperture 198 into the chamber 56 and way from the coupling 190 and the bearing 192.

Figure 5:
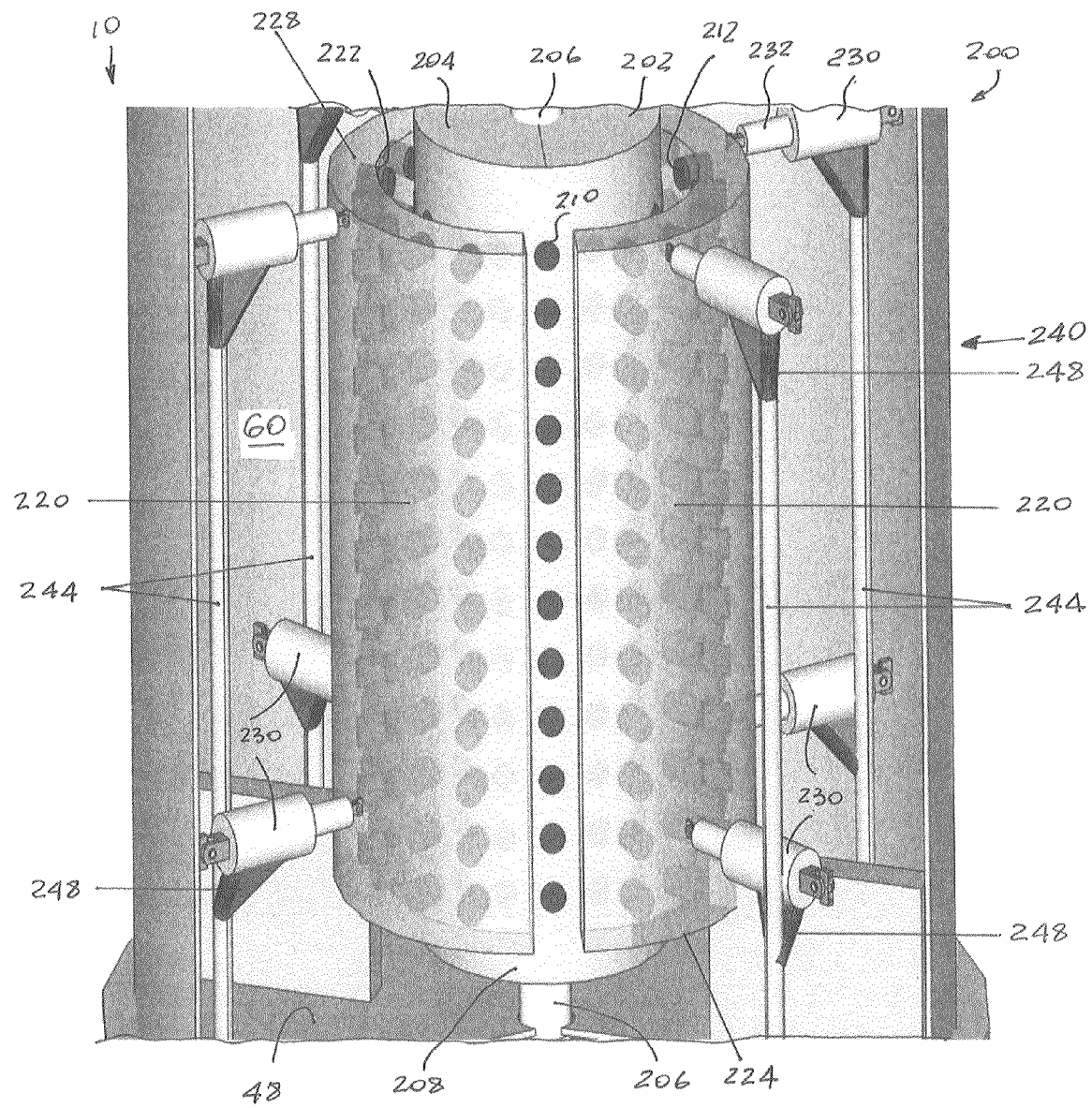
FIG. 5 is another partial enlarged view of the apparatus of FIG. 2, particularly illustrating an electro-magnetic metallurgy high energy density powered push-repel two stage magnetically levitated magnet stack drive generator.

Now in a particular reference to FIGS. 2 and 5, a further element of the apparatus 10 is an electro-magnetic metallurgy high energy density powered push-repel two stage magnetically levitated magnet stack drive, generally designated as 200, which is mounted above the turbine assembly 180 in chamber 62 between plate shaped members 48 and 50. The drive 200 includes a member 202 mounted along longitudinal axis of the apparatus 10 and having a generally round or tubular cross-section in a direction normal to a length thereof. A shaft portion 206 extends axially from each end 204 of the member 202. One or more magnets 210 are mounted on an exterior surface 208 of the member 202.

Two pair of rings 216 are positioned in a spaced apart relationship with a respective end 204 of the member 202 and manufactured from a magnetic material. Two collars 218 are also provided with each being mounted on each shaft portion 206 and further being disposed inside a respective pair of rings 216. Rings 216 and collars 218 essentially provide magnetic bearings.

Two plates 220 are positioned in a spaced apart relationship with the exterior surface 208 of the member 202, each of the two plates 220 having an arcuate (half-moon) cross-section in a direction normal to a length thereof and a generally uniform thickness throughout. One or more magnets 212 are positioned on an interior surface 222 of each plate 220 in alignment with one or more magnets 210 positioned on the exterior surface 208 of the member 202. Preferably, the magnets 212 are identical to magnets 210, although different sizes are contemplated by the invention.

At least two and preferably four cylinders 230 are positioned in a radial pattern in proximity to lower edges 224 of the two plates 220, each having a linearly movable piston 232 operable to engage exterior surface 226 of a respective plate 220.

At least two and preferably four more cylinders 230 are positioned in a radial pattern in proximity to upper edges 228 of the two plates 220, each having a linearly movable piston 232 operable to engage the exterior surface 226 of the respective plate 220.

There is an arrangement 240 to support the cylinders 230. The arrangement 240 includes a pair of tubular annular members 242 spaced apart with each other and aligned with each group of cylinders 230. Each tubular member 242 has a hollow interior configured to pass the hydraulic pressure therethrough. There is also a plurality of first elongated members 244 disposed along a length of the pair of plate members 220 and having each end thereof attached to a respective tubular member 242. Also provided, is a plurality of second elongated members 246 attaching the pair of tubular members 242 to an inner surface of a peripheral wall 22 of the housing 20. Finally, there is a connection between each of the cylinders 230 and the first reservoir 80. Supports 248 may be also provided for tubular members 242 and/or cylinders 230.

The drive 200 is presently preferred to initiate rotation of the turbine 180, however it can be omitted in certain applications, particularly where the electric energy is available from capacitors 322 or other sources.

A support frame 252 has a first portion 254 disposed generally planar to the plate shaped member 50 positioned above the drive 200 and a pair of second portions 256 tapering out so as to secure the support frame 252 to the plate shaped member 50. A hybrid synergy drive gearbox 258 is suspended from the first portion 254 of the support frame 250. A first piston type pump 262 is supported on the first portion 254 of the support frame 252. There is also another generally U-shaped bracket 264 that fastened to the first portion 254 and that is configured to mount the first piston type pump 262 in an upright manner and along the longitudinal axis 12 of the apparatus 10. The hybrid synergy drive gearbox 258 has a shaft portion 268 that is connected by way of another coupling 266 to the shaft portion 206 extending upwardly from the drive 200. A second piston type pump 268 is mounted axially between the drive 200 and the turbine assembly 180 and is generally sized smaller than the first pump 262. However, it is contemplated that a single pump, either 262 or 268 can be employed.

The apparatus 10 further contains a fluid conduit assembly, generally designated as 270 that supplies hydraulic fluid 82 and nitrogen gas 88 to the above referenced components and returns hydraulic fluid 82 and nitrogen gas 88 to their respective reservoirs. By way of one example only, the fluid conduit assembly 270 includes a first supply conduit 272 connecting the first reservoir 80 with each of the turbine assembly 180. A first control valve 274 is operatively mounted within the first conduit 272, whereby a hydraulic fluid is supplied to the turbine assembly 180. A first solenoid operable check valve 276 is mounted intermediate the first control valve 274 and the first reservoir 80. A first filter 278 is mounted within the first conduit 272 above the control valve 274. A second conduit 280 connects the second reservoir 86 with an inlet in each of the first and second pumps, 262 and 268 respectively. A second control valve 282 operatively mounted within the second conduit 280. A third conduit 284 connects the second chamber 56 with an inlet in each of the first and second pumps, 262 and 268 respectively. A suction member 286 is attached to an end of the third conduit 284 disposed within the second chamber 56, which is essentially a third reservoir filled with hydraulic fluid. A second solenoid operated valve 288 is mounted within the third conduit 284 and connected to a controller so as to control hydraulic fluid flow to the pump 268. Filters 290 and 291 are mounted within the third conduit 284. A fourth conduit 292 connects outlet of the first pump 262 with the first reservoir 80. A third solenoid operable valve 294 is mounted in the fourth conduit 292 in close proximity to the first reservoir 80 so as to control return hydraulic fluid flow. A firth solenoid operable valve 296 is mounted in the fourth conduit 292 within the second chamber 56. A spot and cap 297 are provided to fill the second chamber 56. Oil level gage 299 is also provided to indicate the level of hydraulic oil in chamber or third reservoir 56. A fifth conduit 298 connects outlet of the first pump 262 with the second reservoir 86. A first hose 300 is configured to connect the first reservoir 80 to external supply of hydraulic fluid (not shown). A second hose 302 is configured to connect the second reservoir 86 to external supply of nitrogen gas (not shown). A first pressure gage 304 is positioned external the housing 20 and is configured to display pressure within the first reservoir 80. A first pressure relief valve 306 is mounted intermediate the first pressure gage 304 and the first reservoir 80. A sixth conduit 308 connects an outlet of the second pump 268 with the fourth conduit 292. A third normally open solenoid operable check valve 310 is mounted within the sixth conduit 308. A second pressure gage 312 is positioned external to the housing 20 and is connected to the sixth conduit 308, the second pressure gage 312 is configured to display pressure of hydraulic fluid exiting the second pump 268. A second pressure relief valve 314 is mounted intermediate the second pressure gage 312 and the second pump 268. A seventh conduit 316 connects the first conduit 272 with the fourth conduit 292 in proximity to the first reservoir 80.

The final element of the apparatus 10 is a control assembly, generally designated as 320, and including a high density electric storage capacitor 322 mounted within the first chamber 54 external to the linear generator 150, an enclosure 324 also mounted within the first chamber 54 external to the linear generator 150. A receptacle 326 is disposed within the enclosure 324 and has a first electrical connection to each of a source of electric energy supply and user load connection (not shown) by way of a first electric conduit 327. A software operated controller 328 is mounted within the enclosure 324. A voltage controller regulator 330 is also mounted within the enclosure 324. A second electrical connection 332 is provided between the receptacle 326 and the electric generator motor 258.

Figure 6:
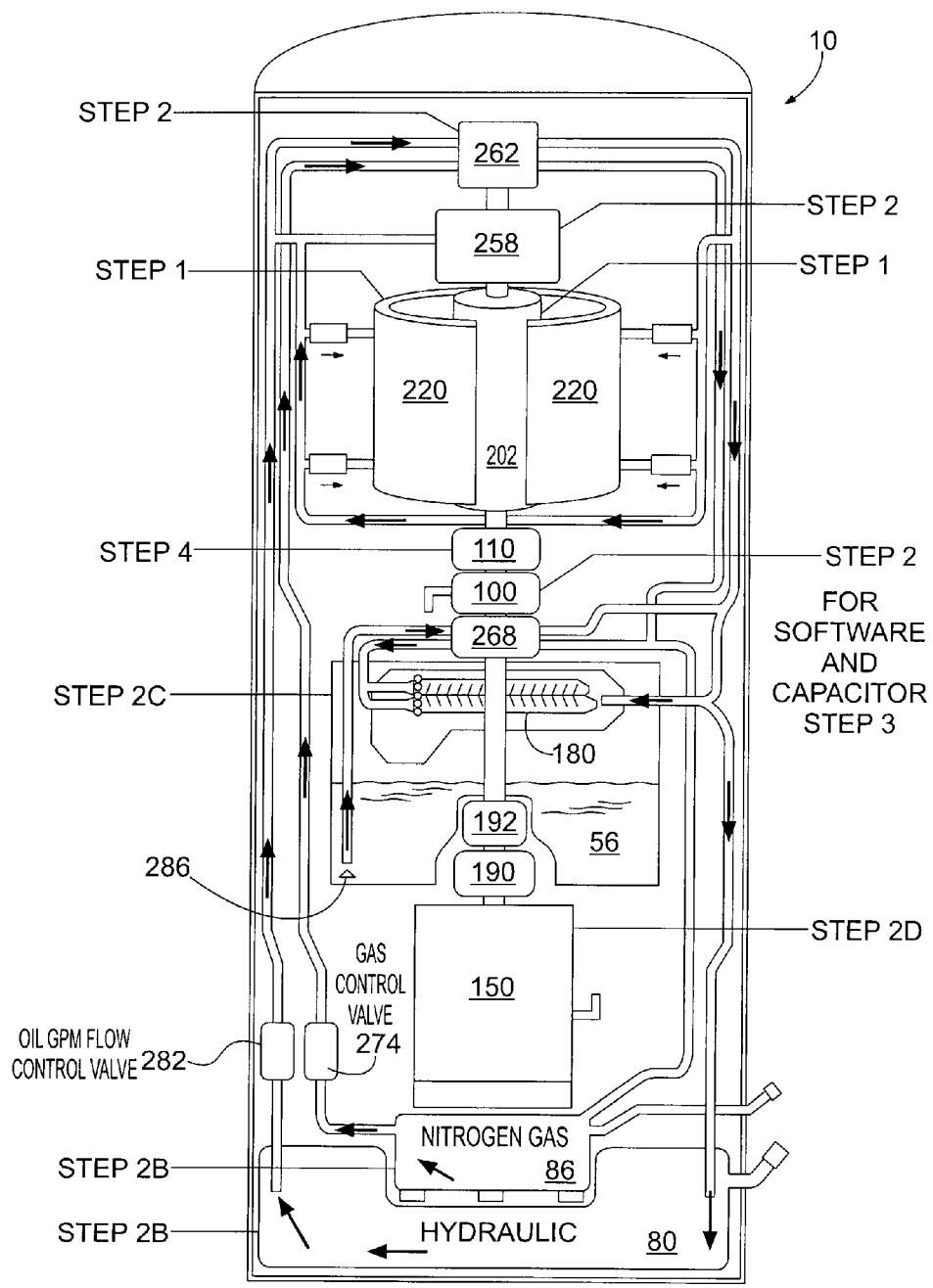
FIG. 6 is a schematic block diagram of the apparatus of FIGS. 1-5.
Figure 7:
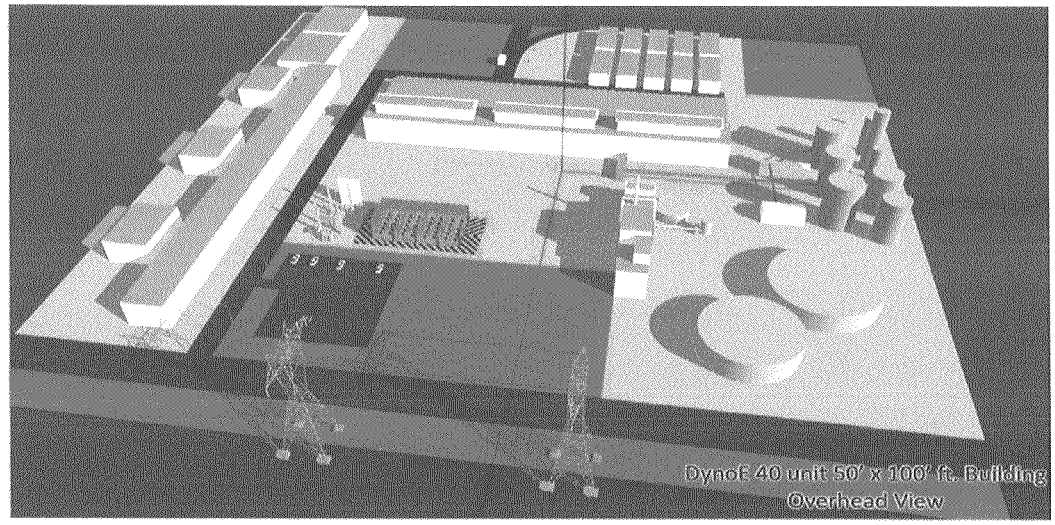
FIG. 7 illustrates one environmental view of using the apparatus of FIGS. 1-6 in a manufacturing facility.
Figure 8:
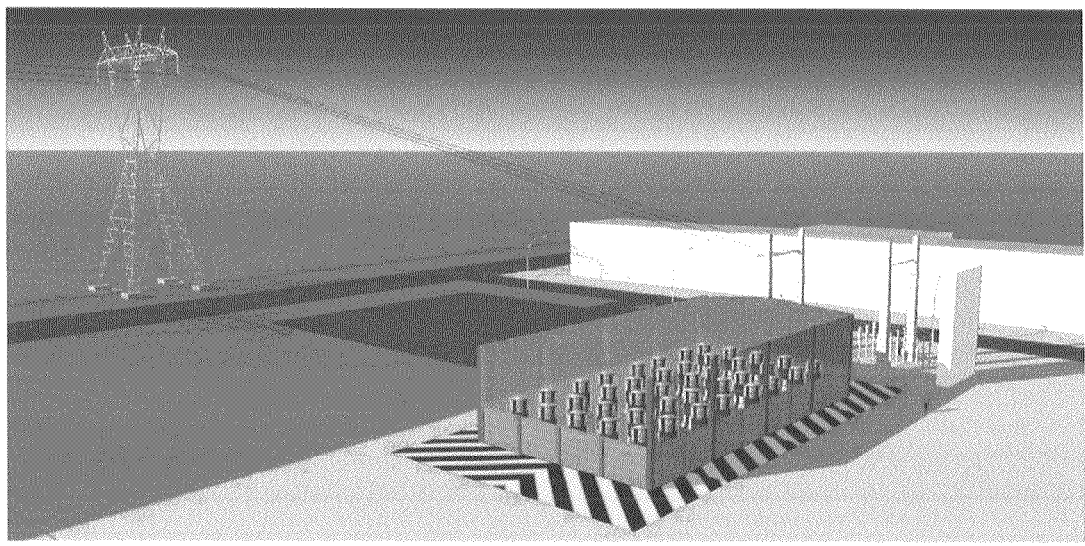
FIG. 8 illustrates another environmental view of using the apparatus of FIGS. 1-6 in a manufacturing facility.
Figure 9:
FIG. 9 illustrates one environmental view of using the apparatus of FIGS. 1-6 in a residential dwelling.
Figure 10:
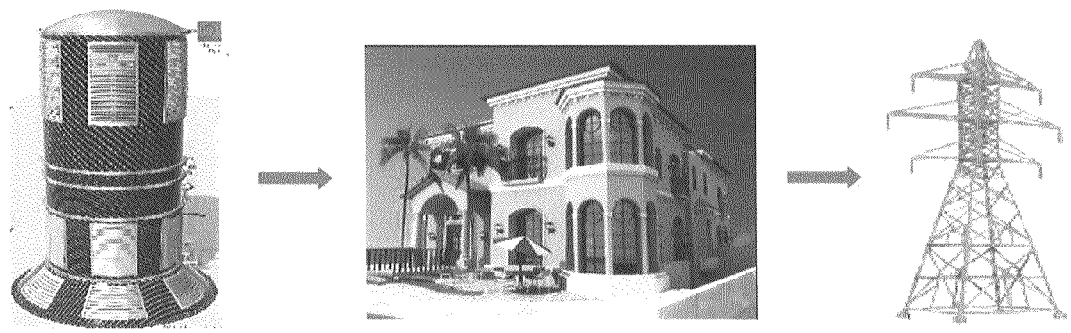
FIG. 10 illustrates another environmental view of using the apparatus of FIGS. 1-6 in a residential dwelling.
Figure 11:
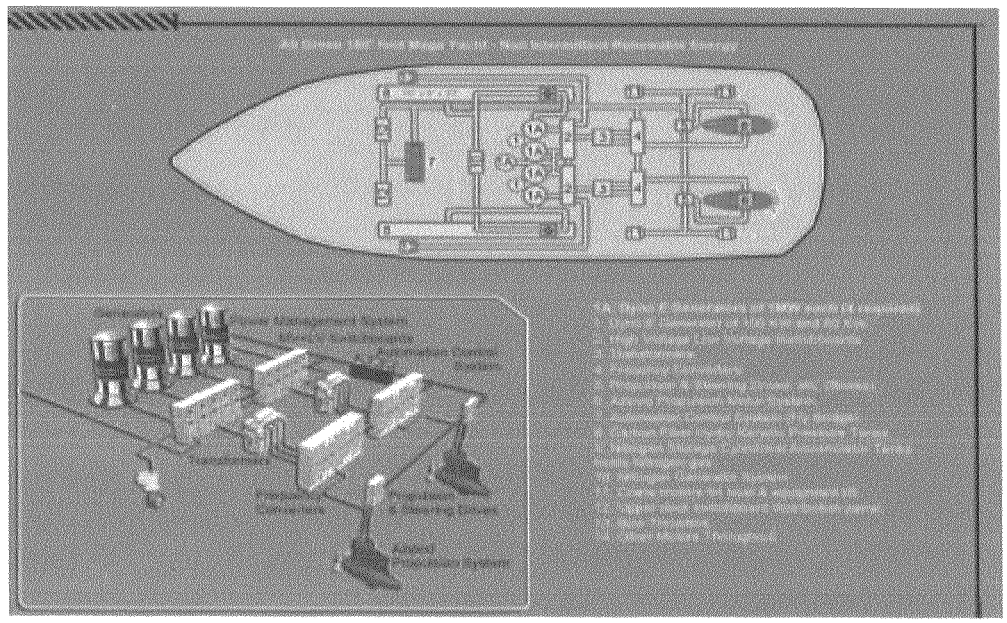
FIG. 11 illustrates one environmental view of using the apparatus of FIGS. 1-6 in a marine application.
Figure 12:
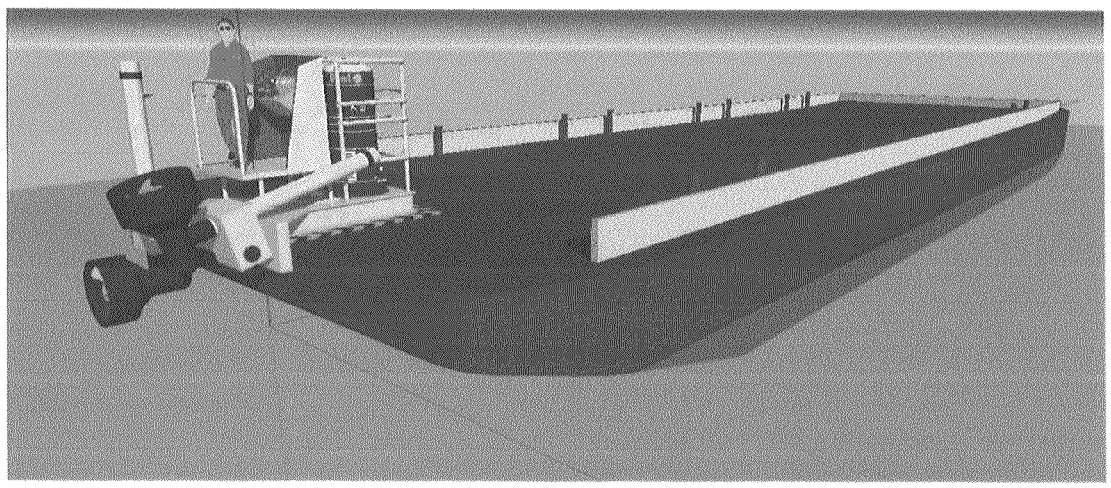
FIG. 12 illustrates another environmental view of using the apparatus of FIGS. 1-6 in a marine application.
Figure 13:
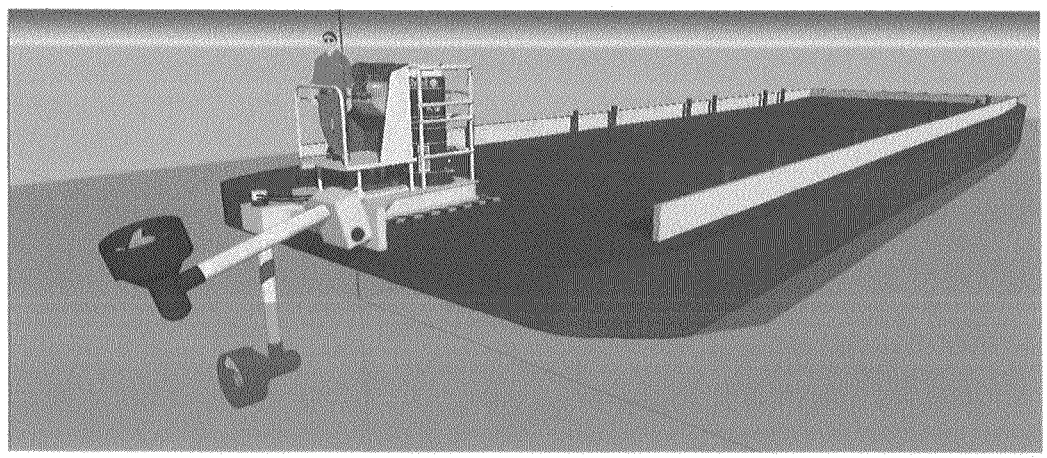
FIG. 13 illustrates yet another environmental view of using the apparatus of FIGS. 1-6 in a marine application.
Figure 14:
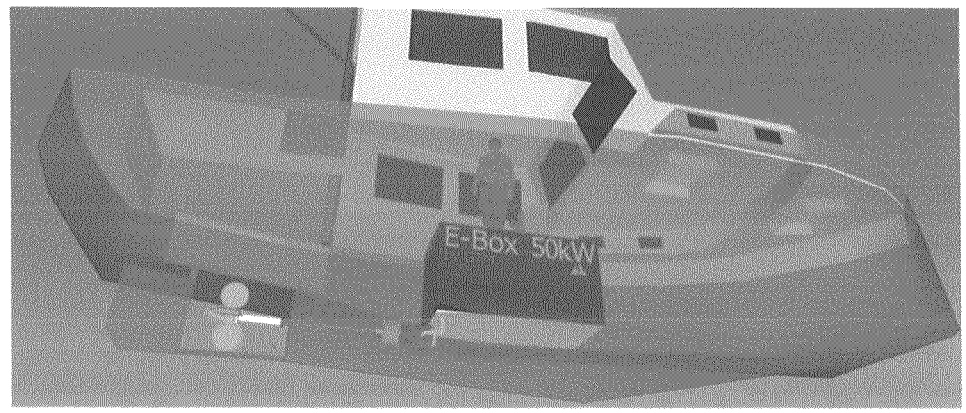
FIG. 14 illustrates a further environmental view of using the apparatus of FIGS. 1-6 in a marine application.
Figure 15:
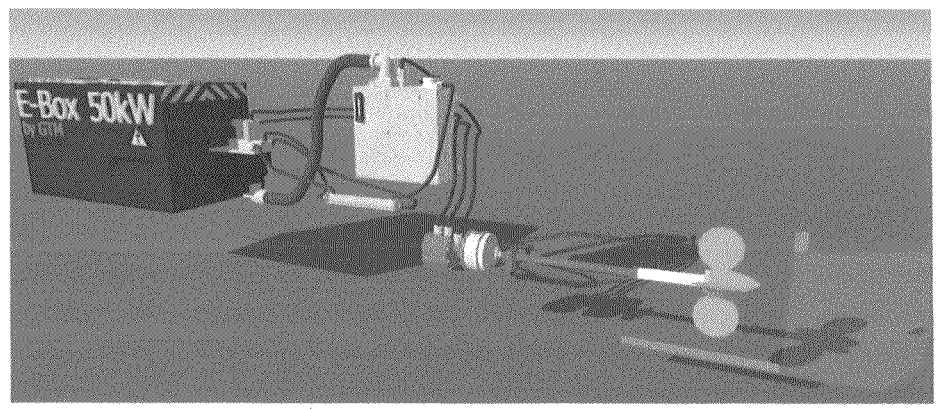
FIG. 15 illustrates yet a further environmental view of using the apparatus of FIGS. 1-6 in a marine application.
Figure 16:
FIG. 16 illustrates one environmental view of using the apparatus of FIGS. 1-6 in a sporting structure.
Figure 17:
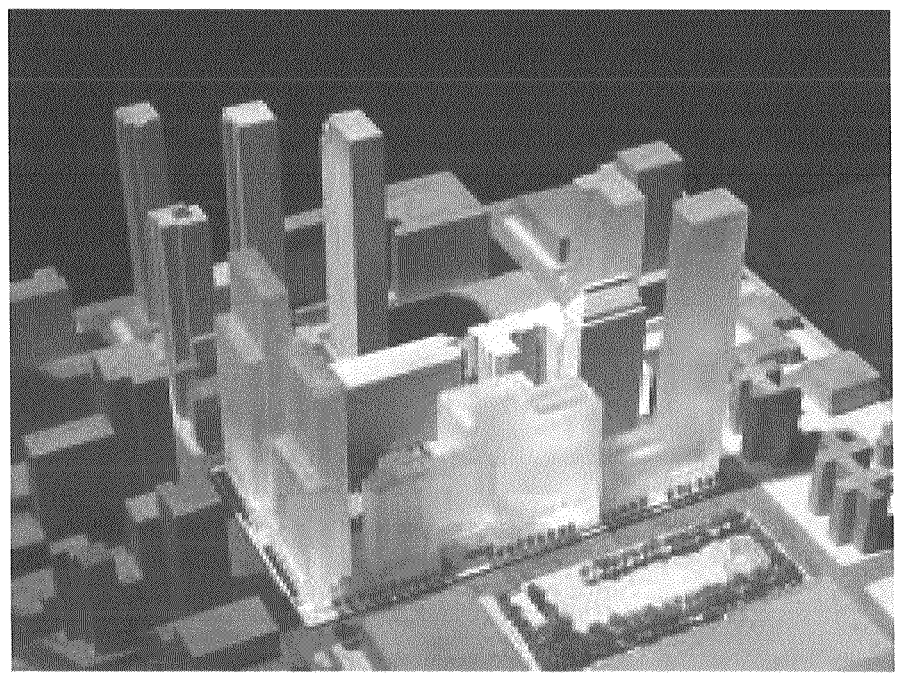
FIG. 17 illustrates one environmental view of using the apparatus of FIGS. 1-6 in an urban environment.
Figure 18:
FIG. 18 illustrates one environmental view of using the apparatus of FIGS. 1-6 in a resort application.
Figure 19:
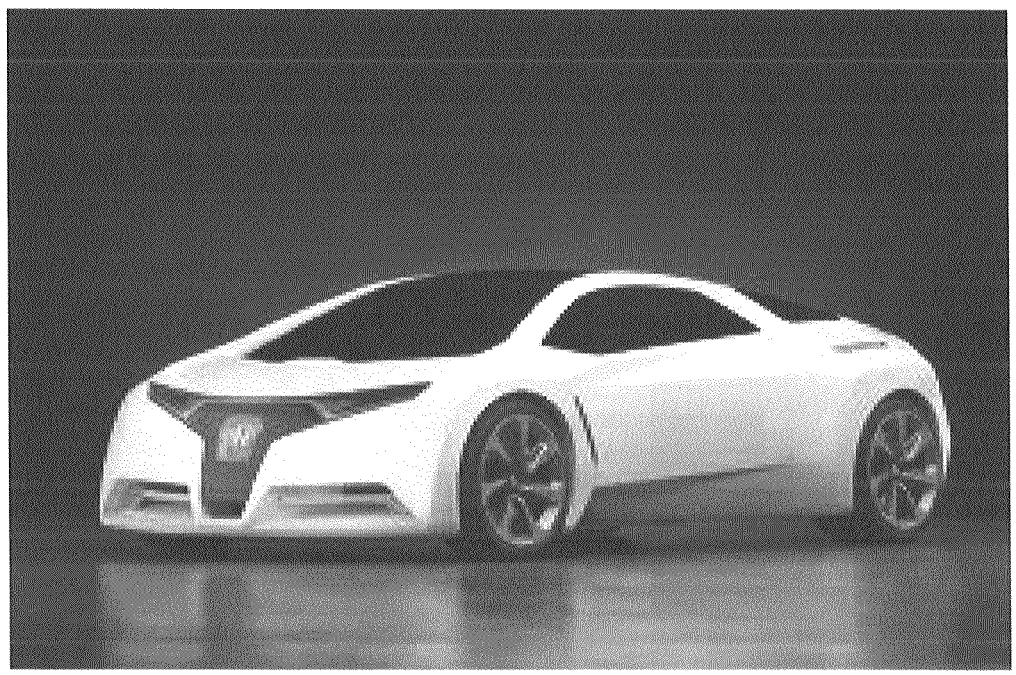
FIG. 19 illustrates one environmental view of using the apparatus of FIGS. 1-6 to power automobile.
Figure 20:
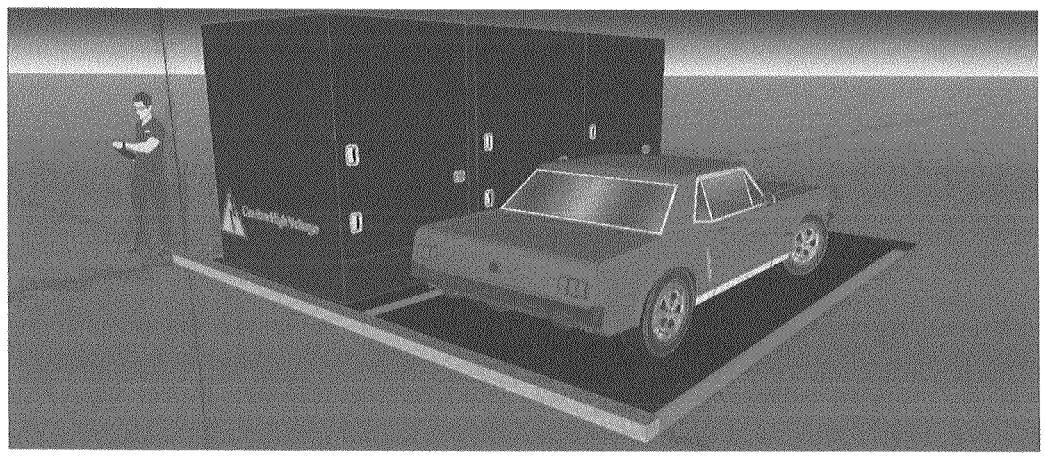
FIG. 20 illustrates one environmental view of using the apparatus of FIGS. 1-6 to charge automotive vehicle.
Figure 21:
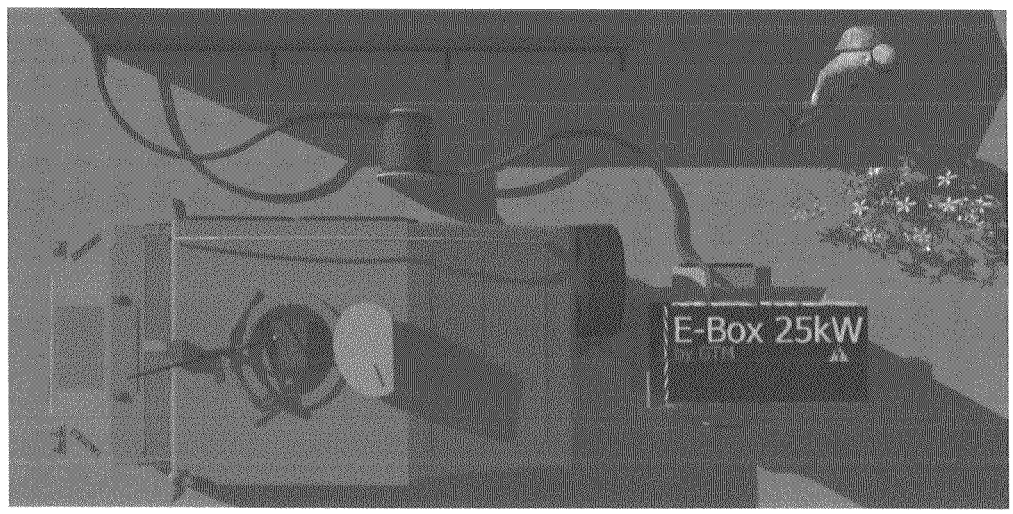
FIG. 21 illustrates one environmental view of using the apparatus of FIGS. 1-6 in a military application.
Figure 22:
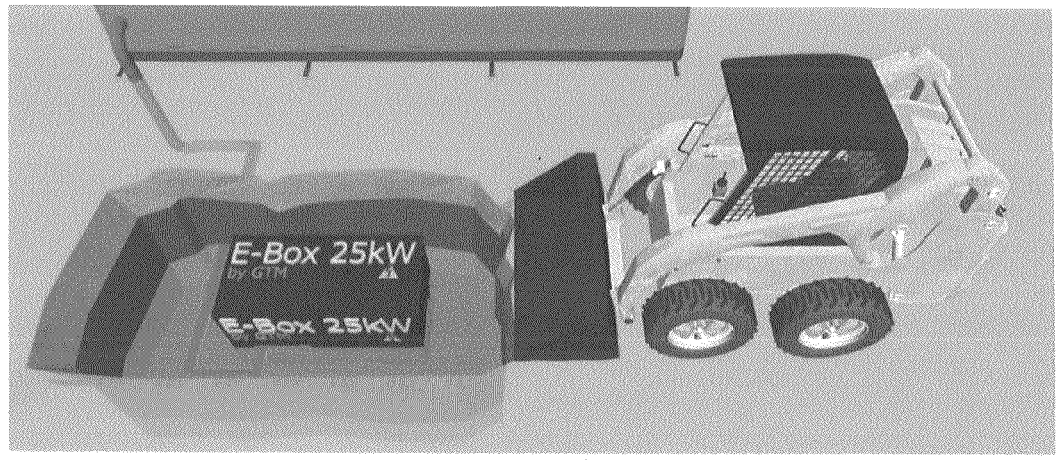
FIG. 22 illustrates another environmental view of using the apparatus of FIGS. 1-6 in a military application.
Figure 23:
FIG. 23 illustrates yet another environmental view of using the apparatus of FIGS. 1-6 in a military application.
Figure 24:
FIG. 24 illustrates a further environmental view of using the apparatus of FIGS. 1-6 in a military application.

The following description is further related to structure and operation of the apparatus 10, in view of FIG. 6 and is particularly applicable to the apparatus 10 generating 1 MW of power.

In step 1, an electro-magnetic metallurgy high energy density powered push-repel two stage magnetically levitated magnet stack drive cylinder 202 is electrically energized by two (2) half-moon high energy density magnet plates 220 g and optional one or two small alternators (1.5 kw to 5 kw) 100 (only one shown in FIG. 6) that shunts storage power to the high electric energy storage hybrid ultra-capacitors 322 of new technology the second stage power source, to the controller 328 and gearbox 258. The other alternator 100 (not shown), when in use, is preferably mounted above the drive 200. By pressing the start button (not shown), a small amount of stored hydraulic fluid 82 is released from the pre-charged high pressure first reservoir 80. Apparatus 10 is so configured that only about 10 PSI of hydraulic pressure is required to activate the all hydraulic pistons 232 which are connected to the plates 220. The pistons 232, when activated, through relevant valves, will extend and push the half-moon plates 220 together, thus electrically energizing the center magnet cylinder stack and causing the shaft 206 to turn. The magnets 210, 212 are so positioned and their quantity is so selected that the shaft 206 turns in excess of 10,000 RPM's, although other revolutions are also contemplated. Although the RPM's are designed to be especially high, the torque output is low and not enough torque power is present to start or run the apparatus 10. However, via a software control hybrid synergy type gearbox drive 258, by shunting electrical power between the high energy density storage ultra-capacitors 322 and software thus controlling the high RPM's to a safe operating speed and torque driving it to its correct rated power to start and run one or two small 1.5 kw to 5 kw electric AC alternator motor's 100 at 500 RPM'S to 3,500 RPM's thus energizing and storing large amounts of electric energy within the supper high storage ultra-capacitors 322. However, the instant invention also contemplates that ultra-capacitors 322 can be pre-charged at the factory or distributor prior to installation in the field. The ultra-capacitors 322 also activate a second computer software algorithm operating other components throughout the apparatus, such as the synergy gearbox 258 software backup.

In step 2, the two small electric generator motor and hybrid synergy-gearbox are connected and drives a high powered hydraulic piston drive pump 262 which takes in 2,000 PSI of high pressure hydraulic fluid 82 and 5,000 PSI of nitrogen gas 88 from the pre-charged high pressure hydraulic oil and nitrogen gas accumulator reservoirs, 80 and 86 respectively, "the first energy source" to power the main turbine wheel 184 which turns a magnetically levitated AC generator motor 150, thus eliminating torsional, lateral, bending axil shear-stress loads, friction and heat. It has been found that the hybrid hydraulic and nitrogen gas system can reach pressure in excess of 300 times earth's atmosphere pressure or over 330 bars (4,785 psi), which is the same as the electro-magnetic high pressure propulsion system used to catapult launch jet fighters and a 30 ton Grumman E-2C Hawkeye planes in 5 seconds from the deck of a U.S. aircraft carrier with over 95,000 hp. Inspired by this technology the Roller Coaster Industry has down scaled the technology via laboratory engineering computer modeling to create the world's fastest roller coaster the Formula Rosa electro-magnetic high pressure propulsion system. Installed in Abu Dhabi the UAE to fling passengers at up to 150 miles per hour with 20,800 hp and propelled to a height of 170 feet in less than 6 seconds. We have also down scaled the Formula Rosacoaster system via laboratory engineering computer modeling to power start and run our machine at 1,600 hp thus surpassing our torque power requirements. The hydraulic and nitrogen gas will return to the accumulator reservoirs, 80 and 86 respectively, the start valve during starting mod will open to release the hydraulic fluid. The pressurized nitrogen gas 88 from the piston pump 262, shoot pressurized hydraulic fluid out of the accumulators towards the hydraulic drive pump or turbine wheel 184 to start and run the apparatus 10, the software will close the inlet valve maintaining always a full pressurized reservoir of hydraulic oil and nitrogen gas ready to restart the system or supply more power on-demand if required via the software that controls and matches performance of both electric generator and propulsion performance. With the valve closed it diverts the high pressure hydraulic fluid propulsion to the hydraulic drive unit and/or turbine wheel maintaining the required safe RPM speed to generator torque of 5,700 Nm (1,600 hp).

In step 3, once the software algorithm has stabilized the apparatus 10 to its rated electrical power to systems performance, the software algorithm will slow-down the magnet stack half-moon plates 220 to an idle speed.

In step 4, an additional redundant back-up system, a smaller second software controlled gearbox 110 along with a second high pressure propulsion drive unit 268 located just above the turbine wheel assembly 180 and directly connected to the generator drive shaft 188 which takes-up part of the torque electrical load from the generator affording the upper main piston pump motor drive a rest. At this point the apparatus 10 is running at full load capacity. The end result is that the energy input by employing a pre-charged propulsion system, electro-magnetic energy drive generator, synergy drive gearbox, hydraulic drive turbine, magnetically levitated electric generator motor, proprietary software, energy storage capacitors and others is the input power required to start and run the system these are higher than the output generating power, which is expected, however, the electrical output service is reliable, constant and abundant, thus requiring no hydrocarbon fuels, natural gas or harsh chemicals to run the system.

For the sake of reader's convenience in understanding the instant invention, a magnetic bearing is a bearing which supports a load using magnetic levitation. Generally, magnetic bearings support moving heavy machinery without physical contact, for example, they can levitate a rotating shaft and permit relative motion without friction, heat or wear. They are in service in such industrial applications such as: Germany and Japan's Maglev a magnetically levitated passenger trains that use electro-dynamic suspension, or EDS, that use the push and repelling forces of magnets for its movement, it floats over a guide way that uses the basic principles of magnets in place of steel wheels and steel tracks and uses electromagnetic propulsion to move it. Instead of using fuel, the magnetic field created by the electrified coils in the guide way walls and track combine to propel the train forward, speeds in excess of 300 mph (500 kph) by superconducting electromagnets that are capable of conducting electricity even after the electric power supply has been turned off and it also saves energy; electric power generation, petroleum refining, machine tool operation and natural gas pipelines and others.

In order to build a true electrometallurgy magnetic high energy density drive motor, one must understand the electromagnetic quantum energy fields around magnets and there powerful electric energy capabilities, the encompassing ambient electric magnetic energy that's all around us, in the air, in space, and in all matter. Envision all the trillions of atoms on the point of a pencil. All of these atoms have electrons surging around at the speed of light! The quantum magnetic fields are the very patterns that determine how energy should be expressed at the atomic, subatomic and molecular levels, after all it's one of the key elements that keep our universe and planets in constant flux thus keeping planet earth were it should be. The attraction force of magnets with opposite polarity and repulsion force of magnets with the same polarity are used relying on its powerful hidden source of internal high density, quantum magnetic energy fields to induce motion to a device. The best kept secret about the quantum electric energy density of a magnet motor drive evolves around the coil connected to an RF amplifier that creates a high frequency oscillating magnetic field, when controlled by software it stores energy into the storage capacitors while it creates another quantum magnetic field on the other side called "resonance magnetic field" created by the quantum electric magnetic field within the magnet drive motor, in which two pieces (one on each side) have the same resonant frequency, to allow the transfer of electricity between them. Moreover the correct geometry positioning of each magnet is required, along with the correct size, type and metallurgical blend of the magnets especially when used in tandem with electrochemical and/or metallurgy sources for electric energy storage capacitors.

However, building a magnet drive motor to generate electricity is only half of the equation. The magnet motor must be big and/or powerful enough to induce a positive energy rotation and torque to an electric motor let alone a generator under a full electric load. In the instant invention, powerful electromagnetic high energy density magnet generator converts the rotation energy of the magnet motor to run a hybrid synergy type gearbox 258, down stepping the excessive RPM's to run a small electric generator motor located above the hydraulic drive pump or turbine 180. The small electric generator motor starts the electronic software and energizes the electro metallurgy high density electric energy storage ultra-capacitors 322, preferably of a new Nano technology.

Capacitors 322 are electrochemical double layer ultra-capacitor type. Capacitors are traditionally known as quick and powerful but energy poor, capacitors have transmuted into quick, powerful and energy rich storage devices that performs more like a battery, whose first application are being employed in hybrid electric cars, trucks, busses, boats and the Apparatus 10 as backup power supplies, these can give faster more energy on demand to help kick-start and run the Apparatus 10.

In the instant invention, the one and only source of energy is the powerful electrometallurgy high electric energy density magnetic cylinder drive stack motor generator a hidden source of energy to create a powerful induction of electric energy field around the magnets along with the powerful high density electric energy storage devices in tandem with the high pressure hydraulic and nitrogen gas propulsion drive unit and the pre-charged hydraulic and nitrogen gas accumulator tanks to kick start and run the machine, makes it totally independent of hydro carbon fuels.

The high performance electrometallurgy electric magnetic energy force created by the high powered neodymium-Boron and other metallurgy blend of magnets 310, 312 and powerful high density electric energy storage devices 322 within the enclosed space of the machine are just some of the key elements of the Apparatus 10.

The principle of apparatus 10 can be further described in relationship to various stages.

The first stage has one stack defined by the cylinder 202 which is magnetically levitated by way of magnets 216 and collars 218 and which is mechanically connected to both the electric software control hybrid synergy gearbox and a small electric AC generator motor shaft; electrochemical high density electric energy storage ultra-capacitors; and to the hydrokinetic hydraulic fluid and nitrogen gas pre-charged high pressure piston drive pump propulsion unit on the upperend shaft and connected to the lower end shaft of the second smaller hydraulic drive pump or Pelton type turbine wheel shaft. The second stage consist of a larger center coupling magnet stack, forming two (2) separate half-moon plates 220, which orbits around the first stage center magnet stack 202 with magnets 210. The two half-moon magnet plates 220 and the center stack 202 are stocked with high power Neodymium-Boron magnets 210, 212 along with other proprietary metallurgy blends of power-full magnets strategically positioned throughout the first stage center stack and second stage outer coupling magnet stack (the two (2) half-moon magnet plates 220.

The two half-moon magnet stack plates 220 are hydraulically brought together toward the center magnet cylinder stack 202 closing the orbital gap between the two magnet stack stages one and two by at least four (4) and preferably eight (8) small hydraulically operated cylinders 320 with pistons 322 which are energized by hydraulic or by an electric high flow solenoid via the pre-charged electric high energy density storage electrochemical ultra-capacitor 322, for startup and also serves as a second backup starting system along with the third (3) backup system the kinetic pre-charged high pressure hydraulic and nitrogen gas accumulator storage tanks, both systems are controlled by software algorithm. As backup, a manual hand crank system (not shown) to push the two half-moon plates 220 to start the magnetic cylinder stack 202 may be provided. When the magnet stack plates stage two, (the two half-moon plates 220) starts to close the orbital air gap between the center magnetic cylinder stack 202, (stage one and two) the center cylinder drive stack will become electrically energized turning clock wise and as the two half-moon plates continue to close the air gap between (stage one and two) the center cylinder 202 stack will start to turn, picking up speed in excess of 10,000 RPM's, activating the small hybrid synergy drive gearbox 258 by shunting electrical power between the ultra-capacitors 322, the small electric generator and computer software within the system controlling the RPM's to a safe running speed, matching rpm's to nitrogen gas and hydraulic fluid intake psi's acquiring the required rated torque, thus turning a small electric and/or high pressure hydraulic clutch-drive motor, filling the high pressure accumulator reservoirs 80 and 86 of hydraulic fluids 82 and nitrogen gas 88 respectively, while running the hydrokinetic turbine wheel 184 to acquire the right speed with the right PSI and RPM to Torque Output Required to run the AC generator at its rated RPM speed and Torque. Once the apparatus 10 is operating at its rated electric generating output the software algorithm then separates the two magnet stack half-moon plates 220 slowing the first stage magnets cylinder drive stack to an idle speed until their needed again, or to kick start the system, starting the cycle over again via these three redundancies.

The kinetic backup system works by compressing and displacing hydraulic fluid 82 and nitrogen gas 88 by means of a high pressure hydraulic piston drive pump 262 unit controlled by a proprietary software algorithm, which is housed above the (pelton type) turbine wheel assembly 180. A high pressure water or air can be used in lieu of hydraulic oil for some applications. The turbine wheel rotor 184 is an Inconel forging with an Inconel hoop pre-stress. The turbine wheel is mounted in a torque frame and monitored by software to reduce the torque and gyroscopic effects between the turbine assembly 180 to AC generator 150. Furthermore the computer software running appropriate actuators controls the system these can also be used to by-pass the small hybrid synergy gearbox drive 110, and direct the power from the pre-charged (external energy source) high pressure hydraulic and nitrogen gas accumulator reservoirs, 80 and 86 respectively and/or the high energy storage ultra-capacitors 322 to pick up the slack from the magnet stack cylinder drive should it be required or to kick-start the system. This final redundancy is employed when starting the larger 100 kW to 1 MW units at zero RPM's.

The high pressure pump 262 is activated by its first electrical generating cycle as the center magnet cylinder stack continues turning at high RPM's with enough power generation to run two small electric AC generator and a small hybrid synergy gearbox clutch drive system controlled by software to step down the high rpm speed to required torque output, to run a hydraulic piston drive pump that pressurizes the hydraulic oil and nitrogen gas in excess of 300 bars. Since apparatus 10 is preferably pre-pressurized with hydraulic oil and nitrogen gas, the propulsion system can be used to jump start the small electric generator motor without using the magnetic energy cylinder stack drive motor generator this can start after the first propulsion burst. The high pressure cylindrical accumulator reservoirs holding pre-pressurized nitrogen gas to 5,000 PSI together with hydraulic fluids to 2,000 PSI, and the quantum electro metallurgy high energy density electro-magnetic cylinder stack drive motor generator are the energy source for starting and running the turbine to its required rpm and torque. The piston drive pump move high pressure hydraulic fluids from the pre-pressurized reservoir tanks, the two materials are separated by the movable piston drive pump. As the pump transfers the hydraulic fluid into the accumulator the fluid is compressed by the piston within the pump. This compresses the nitrogen gas until its internal pressure reaches the required pressure to torque requirement controlled by the software. Torques higher than 60,000 newton meters can be achieved. However, in the apparatus 10, hybrid hydraulic oil and nitrogen gas system can reach pressure in excess of 300 times earth atmosphere pressure. Once the hydro kinetic turbine is running on its own and at the correct RPM and torque. The nitrogen gas injection is stopped when the high pressure accumulator reservoir is full again and ready to run when activated by software maintaining dynamic and static pressure at all time as it continues to run the hydraulic drive unit or hydro-kinetic turbine producing 1.5 KW to 1 MW (1,600 HP or 3,400 Nm) at zero RPM, of non-intermittent power. The software can stop or slow down the hydraulic drive pump 268 and turbine assembly 180 if it detects abnormal high torque gyroscopic effects from turbine to the frame structure or a sudden drop in fluid and/or gas pressure and not able to hold its full pressure load, allowing the first and second stage magnet stacks to take over or compensate for some of the load, affording the turbine, hydraulic pump and fluids a rest, thus extending the service life cycle of the kinetic turbine and backup system. Software may sound an alarm warning of a potential shout down and/or technical problem and contact the owner or operator.

Conduit (pipe) diameter is very important within the third reservoir 56 and accumulator reservoirs 80 and 86; a non-regulated pipeline will cause the fluid flowing in it to lose some energy to friction. The pipe must be large enough for the maximum quantity of water, air or hydraulic fluid that it will carry. The Apparatus 10, thus, has no loss of energy due to pipeline friction. The pressurized pipe or quick disconnect pressure hoses are located within the pressurized accumulator reservoir, and because the distance from the reservoir to the outflow hydraulic drive unit or jet nozzle is static and the available dynamic and static head from the hydraulic pump and accumulator reservoir can put out over 2,000 ft. of head× 3,000 gpm×2,000 psi of outlet flow, thus maintaining static pressure and running head within the reservoir and pipe at all times thus acquiring a higher mechanical power output to shaft Torque at zero RPM to generator load ratio. These external sources of energy power inputs into the machine are higher, although the end result is a lower electrical output from the AC linear generator 150 which is expected however with the electric output capacitor factor is 95%, thus resulting in reliable, constant and abundant electric energy.

The system provides a software control hydraulic and/or electric solenoid gate valves in the conduits throughout the apparatus 10 just before the hydraulic drive unit or turbine housing along with a pressure gauge on a "T" fitting, just above the gate valves to read the static pressure on the gauge when the valve is closed and the dynamic pressure when the gate valve is opened.

The maximum power that can be delivered by the internal conduit to the hydraulic pump drive unit 262, 268 or turbine assembly 180 will occur when the dynamic pressure is approximately ⅔ of the static pressure. The actual flow rate of the hydraulic fluid in the hydrokinetic system which is determined by the diameter of the Pelton type turbine assembly 180 and the diameter of the jet nozzle orifice. Turbine assembly 180 is adapted with the nozzles sized sufficient to meet required kW output. However, it is presently preferred to use a small hydraulic pump drive unit to turn the AC generator motor shaft 188 in lieu of the Pelton type turbine wheel, thus preventing gyroscopic effects by the high torque to the machine frame.

The hybrid gearbox 258 by shunting electrical power between the ultra-capacitors 322 and/or the one or two small electric AC generators 100 and software thus running off the ultra-capacitor battery storage to even out the load on the magnet cylinder stack drive motor generator reducing high RPM's to the required torque to drive the piston pump. Moreover, as an additional back up, a power boost from the one or two small electric AC generators 100 and/or the electric energy storage ultra-capacitors 322 or via the high pressure propulsion from the pre-pressurized accumulator reservoirs 80, 86 for periods of rapid acceleration for kick starting the machine. During normal operation the electro-magnetic cylinder drive and hybrid synergy gearbox 258 can be operated at near idle speeds thus maintain torque levels at zero RPM's. The mechanical gearing design of the system controlled by software allows the mechanical power from the magnet cylinder stack drive 200 to maintain constant rotation speed to maintain constant rated torque for the small generator or hydraulic piston pump drive. A computer program running appropriate actuators controls the system although these can by-pass the gearbox via the hydraulic or electric clutch, and directs the power from the pre-charged hydraulic and nitrogen gas accumulator tanks and/or energy storage ultra-capacitors to kick-start or pick up the slack from the gearbox and/or the magnet cylinder stack drive.

Software within the controller 328 is equipped with diagnostics routines or algorithms, allowing users of the apparatus 10 to call the manufacturer customer service center at which point they would be asked to press a series of buttons on the wall mounted monitoring screen in their living room or office data center which is indicating the unit's difficulties. This triggers a series of diagnostic tones corresponding to a specific maintenance need that can be identified by a service technician over the phone. For those instances when the problem can't be resolved over the phone, the system would allow the problem to be identified and the field technician would be able to come prepared with the correct parts, materials and personnel so the repair can be carried out in one visit.

Throughout smart grid diagnostics software control system for a 1 MW to 100 MW grid simulator via laboratory engineering computer modeling using new and existing data for; over voltage, under voltage, frequency drop, face to face faults, ground faults, and loads of real world bad things that happens with each electric power generating sites, we will be able to test those explicitly.

The present invention functions as an excellent addition or alternative to other existing power systems playing an integral part in reducing our dependency in non-renewable fuels. When properly placed or installed this invention can reduce our power consumption from other sources by half or allow for complete independence from the power grid when a larger unit is installed.

As shown in FIGS. 1-6, the apparatus 10 of the instant invention is a robust hybrid vertical axis fully magnetically levitated, non-intermittent hybrid AC for land based and DC for ocean generator, different from traditional wind turbines in that their main axis is perpendicular to the ground. Its configuration can employ water and/or air and at least two different hydraulic fluid piston drive pomp and/or turbine wheel blades and sizes it further employs three different types of kinetic energy back up devices integrated into every unit. Allowing the system to run 24/7, 365 days a year without the need for inverters and batteries. Making them ideal for both rural and urban settings, thus offering the commercial and the residential user an opportunity to neutralize the rising cost of fuel and electricity and preserve the environment.

However, it is contemplated to dispose the apparatus 10 generally horizontally, particularly for propulsion generating purposes, as best shown in FIGS. 11-15 and 20-24, with reference to E-box. For propulsion purposes, the shaft 188 can be adapted with either a spline (not shown) or other means to connect, either directly or indirectly, to the shaft of the user device. Furthermore, for propulsion purposes, reservoirs 80 and 82 can be relocated or an aperture (not shown) can be formed axially therethrough so as to extend the shaft 188.

There are many advantages of the instant invention over conventional horizontal and vertical axis wind turbines. The instant invention requires no sun or wind to start or run the machine, because its magnet stack and winding stater are completely magnetically levitated and dynamically balanced, thus moving free with no severe friction loads and with no stress bearing load. Traditional vertical axis wind turbines typically have substantial friction loads and stress bearing loads on their shaft magnet stack and winding staters.

Conventional horizontal axis wind turbines are constantly under stress bearing and friction loads. A typical 1 MW wind turbine prop blade weighs approximately 10 to 26 tons transferring severe bending axle shear stress bearing and friction loads to the main shaft and bearing, thus transferring severe shock friction loads to the gearbox and generator especially at higher wind speeds. A re-evaluation and re-engineering of wind turbines has bought about a new breed of wind power generation and advanced technology concepts in renewable kinetic wind linear generator technologies the design of metallurgy and other materials with extreme strength to mass ratios, geared towards the highest degree of reliability and thus has critically reduced overall turbine mass.

The instant invention is not wind dependent and not affected by the direction of the wind which is useful in areas where the wind changes direction frequently or quickly. Unlike traditional horizontal axis wind turbines no mechanism is needed to turn the wind turbine towards the wind. Because of this the present invention outperforms horizontal axis turbines in areas where a tall tower is not feasible, obstacles are nearby, or the wind is more turbulent. The instant invention is ideal for both rural and urban applications including roof top installations.

Key attributes of the Apparatus 10 of the instant invention as follows:

1. The price of the energy output is determined only by its investment, interest rate and a small maintenance cost, and is not affected by fluctuating world prices of crude oil, coal and natural gas.
2. Not Wind or Sun dependent.
3. Requires no inverter or battery for energy storage.
4. Does not require a tower.
5. Safe to all bird and bats.
6. Noise level is contemplated to fall under 32 dBa
7. Environmentally safe
8. Minimum land preparation required.
9. Can be individually installed adjacent or on top of homes, commercial and industrial buildings.
10. Requires no large foot print of land for installation. Example: on the same foot print required to run just one traditional horizontal wind turbine of 1 MW on a 200' foot tall steel tower, 225 1 MW units of the instant inventions can be installed due to a presently preferred 144 sq. ft. of foot print area, measuring only 12' feet tall, ×an 8' foot wide cylindrical shape body×a 12' foot wide bell bottom shape support base. The apparatus 10 can be separated, by way of clamping member 34, into two 6' feet segments or in a box shape of 17 feet long×8' feet high×7' feet wide (The E-box, 1 MW) to offset any headroom restrictions for shipping.
11. Reduces carbon foot print.
12. Requires no fossil fuels or dangerous chemicals.
13. Stored, easily transported and installed.
14. Robust construction.
15. Low maintenance.
16. At least the housing 20 is manufactured from corrosion proof, carbon fiber, stainless steel, aluminum and fiber glass.
17. Performs in extreme environments.
18. Easily remotely monitored via satellite.
19. Totally software controlled.
20. Aesthetically and architecturally pleasing
21. Few moving parts
22. Maintains base and peak electrical loads at all times.
23. Allows the owner i.e. home, commercial and industry to be completely independent from the energy grid.
24. Anticipated high return on investment, two to five years at current fossil fuel cost, (95% capacity factor).
25. Generates electricity at a rate of under 1 per KW/h, versus $0.23 cents per KW/h on fossil oil, depending on the State or Country, and generator size.
26. Generally less expensive than the traditional horizontal and vertical axis wind turbines.
27. Can be used in many applications such as rural and urban areas; hospitals, military and government boats, ships, high rises, buildings and others.
28. Apparatus 10 is an anywhere, anytime magnetically levitated AC generating motor along with its first and second stage high powered magnetic generator stack and its high pressure hydro-kinetic turbine generating solution with very distinct advantages over conventional solar and wind turbines, with low cost global deployment, better operational performance and greater environmental advantages.
29. The turbine assembly 180 converts kinetic energy stored in the high pressure accumulator reservoir into mechanical energy that drives a vertical axis linear generator with an independent free turning high powered electro-magnetic translator stack.
30. The two powerful magnetic generator stacks along with the high pressure nitrogen gas accumulator reservoir tank, hydraulic oil piston drive pump motor, microprocessor controller and algorithm software, the ultra-high electric energy storage capacitors as well as the fully levitated vertical axis linear generator are the essence of the Apparatus 10 nergy System.
31. The ability to pre-charge the high pressure reservoir tank at the factory or at the distributor be for it is delivered to the end user, so when the unit is installed just simply pressing the start button the apparatus 10 unit will start generating electric power for 24/7, 365 days. Even when the unit is stopped for maintenance the high pressure reservoir will always be ready along with the first and second stage power magnet generator stack to start the electro-magnetic, high pressure hydro kinetic propulsion system.

It is presently preferred for each apparatus 10 to leave the factory or distributor, with fully pre-charged hydraulic and nitrogen gas high pressure accumulator reservoirs, 80 and 86 respectively and electric capacitors 322 fully charged so when the end user installs and starts the apparatus 10, it will be ready to produce electricity, on-demand.

Generally, the norm to acquire electric power is that 2 HP are required for every 1 KW of electrical output.

Apparatus 10 with its hybrid electro-magnetic high density energy drive motor, in tandem with the hydro-kinetic pre-pressurized high powered hydraulic and nitrogen gas propulsion drive system the external energy source, along with the high density electric energy storage ultra-capacitor backup, magnetically levitated AC generator and proprietary software, achieves under 1.5 HP required for every 1 KW of electricity.

For the purposes of illustrating capability of the instant invention, consider an old-time piston steam engine. In this ship, water is turned into high pressure steam in a boiler and conducted by pipes to the pistons that turn the output shaft. Even if the shaft is rigidly locked in place and can't turn at all—say by a chain wrapped around a ship's propeller or turbine—the steam pressure still applies the full amount of torque to the shaft. In other words, a steam engine or a pressure hydraulic and nitrogen gas propulsion system can have maximum torque at zero rpm.

Generator 10 configured for 50 kw output measures 6' feet h.×3' feet Ø diameter cylindrical body×5' feet wide bottom base and weighs 1,200 pounds. Yet, it has been tested to easily turn a 32 inch propeller or 24 inches diameter turbine that would choke a 70 hp diesel.

The above is accomplished because hydro propulsion electric motors provide usable, turbine-turning torque where it is needed most: at the low-rpm speeds at which displacement yachts motor. High pressure propulsion electric motors produce as much torque at low rpm as they do at high RPM's. They can turn as big a prop at 10 rpm as they can at 2,000.

Thus, as an example for marine applications, rather than focusing on horsepower ratings of apparatus 10, focus should be on what size propeller is required and the maximum rpm it needs to turn. Apparatus 10 has been demonstrated to take a larger propeller with a greater pitch than the propeller turned by a standard-equipment diesel with a much higher horsepower rating.

It must be noted that horsepower is a misleading term, especially in marine engines. A diesel's horsepower rating is not a measured quantity, but a calculated one. It only applies at a specific rpm, usually around 2500-2800 for a typical marine diesel. At the low rpm used during most boat operations, actual diesel horsepower is much less than advertised. More importantly, diesel torque is much less than an electric motor and 70% less when compared to apparatus 10 hydraulic and nitrogen gas hydro propulsion system.

Unlike a marine diesel, Apparatus 10 can apply full torque to the shaft at zero rpm even when it's being resisted by a large, electric generating load.

Torque is what turns the turbine, not horsepower. Torque is the twisting or rotary force applied to a shaft. It's measured as a force pushing at a fixed distance on a lever attached at right angles to the motor shaft. In the English system, force is expressed in pounds and the distance is a foot, so the torque unit is the pound-foot (not foot-pound, which is work.) In the metric system, force is in Newton's and the distance is one meter, so the torque unit is the Newton-meter.

When an engine is tested in the laboratory on a dynamometer, torque is the quantity actually measured. Horsepower is then calculated by multiplying the torque in pound-feet by the rpm and then dividing by 5.252. (For the derivation of the formula, see "Mechanical horsepower" and "Relationship with torque" in Wikipedia article.)

Because both horsepower and torque in a diesel engine drop sharply at low rpm, the propeller turned by a diesel engine must be undersized. A large propeller that a diesel engine would in theory have enough torque to turn at high rpm would stall the engine at low rpm, when the torque is much less. And of course, below a diesel's idle speed, typically from 600-1,000 rpm, torque and horsepower disappear completely because the engine stops running.

Apparatus 10 produce flat torque curve. Torque doesn't drop off at low rpm, and there's no minimum idle speed. Apparatus 10 spins as slowly as you want it to at maximum torque and still turns as big a prop as it can at its maximum speed of 2,000 rpm torque is always present.

That is also the reason that the modern diesel locomotives are actually diesel-electric. A steam locomotive has no trouble powering its drive wheels directly to set a 100-car (1 mile), 10,000 ton coal train in motion from a full stop. Its energy source, the fire in the boiler to steam, is external and unaffected by the load on the drive pistons.

In short, that with what happens in a locomotive and marine diesel engine with its internal source of energy. Exploding fuel in the cylinders pushes on pistons that push—apply torque to—the crankshaft. Between explosions, a heavy flywheel at the end of the crankshaft keeps the speed up—and the momentum moving.

At low rpm, there are fewer explosions, a longer period of time between them and less momentum from the flywheel. [Momentum equals $mv^2/2$, so "V" (velocity) is a much more important factor than "M" (Mass) is.] If something—such as a prop that's too big—restrains the shaft from turning, the exploding fuel can't expand, the fires pushing the pistons go out and the engine stalls. Unlike the external energy source of a steam engine or high pressure propulsion electric motor, the internal energy source of a diesel—or any internal combustion engine—is strongly affected by resistance on the output shaft.

But the diesel locomotive's energy source is combustion inside the cylinders, which couldn't take place if the engine were directly connected to the drive wheels. Even multiple 3,200 hp locomotive diesel engines connected directly to the drive wheels would never be able to move the 100-car, 10,000 ton train. Unless it is first running at a high enough rpm, the huge diesel engine in a locomotive can't produce the necessary torque. The multi-gear transmission required for such a massive load would be impossibly large.

So, a diesel locomotive transmits torque to the drive wheels through electric motors. The diesel engine spins an alternator to produce electricity for the motors, and they turn the wheels. Unlike the locomotive's diesel engine, the electric motors can apply full torque to the wheels even when they're held at zero rpm by 100-cars with 10,000 tons of coal.

In apparatus 10, the hydro propulsion system, produced by the hydraulic and nitrogen gas through a high pressure pipe to the turbine shaft, drive motor controller, just like steam flows to a turbine through a pipe.

Apparatus 10 can be applied in various applications.

For poor people in third world countries the Apparatus 10 in a range of about 1.5 KW to about 3 KW output will provide safe constant and abundant AC power without inverters and batteries for 20 plus years.

Some prefabricated home builders are selling homes to governments with renewable energy systems of wind and solar, producing less than 25% of the home electrical requirements using inverters and batteries. Batteries have a life of months or 3 to 4 years. What happens when the batteries or the inverter break down? The home owner would need to replace the batteries or the inverter without any additional assistance from the government. The home owner, who does not have the resources, would then have to revert to using other sources of energy. Owners of new or existing residential and even commercial dwellings can all reap the rewards of being totally off-the-grid while selling the excess power generated by the apparatus 10 back to the grid. Thus, individual home owners can generate more than enough power to go completely off grid and sell the excess power to the national grid.

In some cases, entire communities can form a cooperative and share the benefits derived from installing a community mini power plant. All would realize significant savings in energy bills and would participate in sharing the revenues generated from selling excess power back to the grid.

The housing community could use these funds to pay for the communities grounds keeping, facilities maintenance, upgrades, garbage, water and electricity to light the streets and several other common areas infrastructures.

Another benefit would be derived in the form of eliminating the need for subsidies from state or local municipalities enabling the township to use saved funds on other hard pressing municipal projects.

Developers and/or owners of commercial malls and industrial parks can enjoy providing electrical power to their tenants at very low prices while also selling the excess to the grid, thus, keeping our industries "jobs" and U.S. Dollars in the U.S.

Electric power and water are the two prime movers of high cost worldwide; hospitals, schools, hotels, food, pharmaceutical, chemical, plastics, international airports, military, aerospace, marine, refrigeration, automotive manufacturing, ship yards, ships, submarines, barges, offshore oil platforms, oil refineries, high rise office and apartment buildings are some of the many industries that would benefit by installing an independent, clean and reliable source of energy production such as afforded by the apparatus 10.

Apparatus 10 is contemplated as an external source power that will replace the portable internal combustion engine stand-by generator that requires fuel and oil in order to function.

Low cost Electro-Magnetic-Hydro-Kinetic High Pressure Propulsion Power, the apparatus 10 is an excellent solution for development or barren remote regions of the world were water, electricity, food and housing are scarce or non-existent.

Apparatus 10 can efficiently create a prosperous city in previously unimaginable locations.

Disclosed technology can be used to provide local electric power for potable water desalination, aquaculture to provide seafood, organic aquaponics, irrigation water for agriculture, utilizing the desalinated and recycled water from the aquaculture and aquaponics organic farming along with off-the-grid pre-fabricated affordable homes.

The implications would be tremendous, the ability to create abundant resources such as food and water production, fruits, vegetables and spices, homes, jobs, hospitals and schools.

Industries will soon follow looking for cost effective skilled labor and tax breaks converting what was once a remote barren region, into an all green prosperous industrial community full of joy and hope.

Cost advantages of the apparatus 10 (referenced as Dyno energy in the last line) is shown in the following Table 1.

TABLE 1

| type of energy | technology | Investment US$ per MW Installed | hours of annual operation | generation cost ¢/kWh |
|---|---|---|---|---|
| oil/gas/coal | steam | 1,550 | on demand | 4.6 |
| uranium | atomic plant | 2,850 | 6,500 | 4.4 |
| solar | photovoltaic | 6,500 | 1,000 | 65.0 |
| tide differential | ocean flux | 2,300 | 3,500 | 6.5 |
| wind | land turbines | 1,550 | 2,200 | 7.2 |
| wind | off-shore turbines | 2,500 | 3,600 | 6.9 |
| ocean waves | Pelamis | 3,900 | 4,000 | 9.8 |
| ocean waves | Finavera | 1,700 | 4,000 | 4.3 |
| ocean waves | DynoWave ® | 2,000 | 7,900 | 3.0 |
| Hydro Kinetic Propulsion | Dyno Energy | 2,000 | 7,900 | .05 |

Thus, the present invention has been described in such full, clear, concise and exact terms as to enable any person skilled in the art to which it pertains to make and use the same. It will be understood that variations, modifications, equivalents and substitutions for components of the specifically described embodiments of the invention may be made by those skilled in the art without departing from the spirit and scope of the invention as set forth in the appended claims.

I claim:

1. An apparatus comprising:
   (a) a first reservoir containing a first pressurized fluid therewithin;
   (b) a second reservoir containing a second pressurized fluid therewithin;
   (c) a gearbox;
   (d) a pump mounted axially with and coupled to said gearbox;
   (e) a turbine assembly mounted axially with said pump and said gearbox;
   (f) a conduit and valve assembly connecting, in fluid communication, said first and second reservoirs with each of said gearbox, pump and turbine assembly;
   (g) a controller;
   (h) a magnetically levitated drive axially disposed with and coupled to said gearbox; and
   (i) a housing,
   wherein said first reservoir, said second reservoir, said gearbox, said pump, said turbine assembly, said conduit and valve assembly, said controller, and said magnetically levitated drive mounted within said housing.

2. The apparatus of claim 1, further comprising one or two alternators.

3. The apparatus of claim 1, further comprising a generator configured to generate electric energy, said generator disposed axially and coupled to said turbine, said linear electric generator further electrically connected to a storage of said electric energy or device or devices using said electric energy.

4. The apparatus of claim 1, further comprising an output shaft.

5. The apparatus of claim 1, further comprising another pump axially disposed with and coupled to said magnetically levitated drive.

6. The apparatus of claim 5, further comprising a third reservoir containing said first pressurized fluid therewithin and another conduit connecting, in fluid communication, said third reservoir to said second pump.

7. An apparatus configured to generate electric energy comprising:
   (a) a housing having a peripheral side wall defining hollow interior, said peripheral side wall including a plurality of sections disposed in series with each other, plurality of clamping members, each configured to join adjacent ends of a pair of section, a top portion closing one end of said peripheral side wall and a bottom portion having a frustoconical shape;
   (b) a plurality of plate shaped members disposed in a spaced apart relationship along the longitudinal axis of said housing and dividing said hollow interior into a plurality of chambers, each of said plurality of plate shaped members aligned with a respective one of said plurality of clamping members;
   (c) a first reservoir mounted axially within a hollow interior of said bottom portion and configured to contain nitrogen;
   (d) a second reservoir mounted axially within said hollow interior of said bottom portion and configured to contain hydraulic oil;
   (e) a linear generator mounted above said first and second reservoirs in a first chamber defined by a pair of said plate members, said linear generator including:
      i. a generator housing,
      ii. a generator shaft centrally disposed within said generator housing, said generator shaft having one end portion thereof extending outwardly from one end of said generator housing,
      iii. a first pair of bearings secured inwardly from one end of said generator housing,
      iv. a second pair of bearings secured inwardly from one end of said generator housing,
      v. a pair of collars, each of said pair of collars secured to an outer surface of said generator shaft in operative alignment with a respective pair of bearings,
      vi. a first annular gap formed between an inner peripheral surface of said each bearing and an outer peripheral surface of a respective collar;
      vii. an annular coil stack mounted within a hollow interior of said generator housing mediate said first and second pair of bearings,
      viii. a plurality of annular permanent magnets secured in series on an outer surface of said shaft between said pair of collars, and
      ix. a second annular gap formed between an inner peripheral surface of said coil stack and an outer peripheral surface of said magnets;
   (f) a turbine assembly including:
      i. a hollow turbine housing mounted on another one of said plurality of plate members,
      ii. a hydro-kinetic turbine mounted within said turbine housing above said linear generator,
      iii. a plurality of jets defined within said hydro-kinetic turbine, and iv. a turbine shaft having one end thereof extending downwardly from one end of said turbine housing;

(g) a first coupling connecting one end of said generator shaft with one end of said turbine shaft;

(h) a bearing disposed on said turbine shaft in a spaced apart relationship with said first coupling;

(i) a funnel shaped housing encasing said first coupling and said bearing, said funnel shaped housing having a wider open end thereof attached to a surface of one plate shaped member, positioned in close proximity to an upper end of the linear generator;

(j) a drive mounted above said turbine assembly and including:
 i. a member mounted along longitudinal axis of said apparatus and having a generally round or tubular cross-section in a direction normal to a length thereof,
 ii. one or more magnets positioned on an exterior surface of said member,
 iii. a shaft portion extending axially from each end of said member,
 iv. a pair of rings, each positioned in a spaced apart relationship with a respective end of said member and manufactured from a magnetic material,
 v. a collar mounted on each shaft portion, and disposed inside a respective ring,
 vi. a pair of plates, positioned in a spaced apart relationship with an exterior surface of said member, each of said pair of plates having an arcuate cross-section in a direction normal to a length thereof and a generally uniform thickness throughout,
 vii. one or more magnets positioned on an interior surface of each plate in alignment with one or more magnets positioned on said exterior surface of said member,
 viii. four cylinders positioned in a radial pattern in proximity to lower edges of said pair of plates, each having a linearly movable piston operable to engage exterior surface of a respective plate,
 ix. four more cylinders positioned in a radial pattern in proximity to upper edges of said pair of plates, each having a linearly movable piston operable to engage exterior surface of a respective plate,
 x. an arrangement supporting said cylinders, said arrangement including a pair of tubular annular members spaced apart with each other and aligned with each group of cylinders, each tubular member having a hollow interior configured to pass the hydraulic pressure therethrough, plurality of first elongated members disposed along a length of said pair of plate members and having each end thereof attached to a respective tubular member, and plurality of second elongated members attaching said pair of tubular members to an inner surface of a peripheral wall of said housing, and
 xi. a connection between each of said cylinders and said second reservoir;

(k) a support frame attached to one of said plurality of plate shaped members above said generator;

(l) a gearbox suspended from said support frame;

(m) a first pump supported on said support frame;

(n) a second pump positioned axially between said generator and said turbine; and (o) a fluid conduit assembly including:
 i. a first conduit connecting said first reservoir with said turbine assembly,
 ii. a first control valve operatively mounted within said first conduit, whereby a hydraulic fluid is supplied to said turbine assembly,
 iii. a first filter mounted within said first conduit;
 iv. a first solenoid operable check valve mounted intermediate said first control valve and said first reservoir,
 v. a second conduit connecting said second reservoir with an inlet in each of said first and second pumps,
 vi. a second control valve operatively mounted within said second conduit,
 vii. a third conduit connecting said second chamber with an inlet in each of said first and second pumps,
 viii. a suction member attached to an end of said third conduit disposed within said second chamber,
 ix. a solenoid operated valve mounted within said third conduit and connected to a controller,
 x. a pair of filters mounted in a spaced apart relationship with each other within said third conduit,
 xi. a fourth conduit connecting outlet of said first pump with said first reservoir,
 xii. a third solenoid operable valve mounted in said fourth conduit in close proximity to said first reservoir,
 xiii. a fourth solenoid operable valve mounted in said fourth conduit within said second chamber,
 xiv. a fifth conduit connecting outlet of said first pump with said second reservoir,
 xv. a first hose configured to connect said first reservoir to external supply of hydraulic fluid,
 xvi. a second hose configured to connect said second reservoir to external supply of nitrogen gas,
 xvii. a first pressure gage positioned external said housing and configured to display pressure within said first reservoir,
 xviii. a first pressure relief valve mounted intermediate said first pressure gage and said first reservoir,
 xix. a sixth conduit connecting an outlet of said second pump with said fourth conduit,
 xx. a filter mounted within said sixth conduit,
 xxi. a second pressure gage positioned external said housing and connected to said sixth conduit, said second pressure gage configured to display pressure of hydraulic fluid exiting said second pump,
 xxii. a second pressure relief valve mounted intermediate said second pressure gage and said second pump, and
 xxiii. a seventh conduit connecting said first conduit with said fourth conduit in proximity to said first reservoir; and (p) a control assembly.

8. The apparatus of claim 7, further comprising a shaft configured to transfer torque for propulsion.

9. The apparatus of claim 7, further comprising a generator configured to generate electric energy, said generator disposed axially and coupled to said turbine, said linear electric generator further electrically connected to a storage of said electric energy or device or devices using said electric energy.

10. The apparatus of claim 9, wherein said control assembly comprises:
 (a) high density electric storage capacitor;
 (b) an enclosure;
 (c) a receptacle within said enclosure to a source of electric energy supply;
 (d) a software control panel mounted within said enclosure;
 (e) a voltage controller regulator mounted within said enclosure; and (f) electrical connection between said receptacle and said electric motor.

11. An apparatus configured to generate electric energy comprising:
- (a) a housing having a peripheral side wall defining hollow interior, said peripheral side wall including a plurality of sections disposed in series with each other, plurality of clamping members, each configured to join adjacent ends of a pair of section, a top portion closing one end of said peripheral side wall and a bottom portion having a frustoconical shape;
- (b) a plurality of plate shaped members disposed in a spaced apart relationship along the longitudinal axis of said housing and dividing said hollow interior into a plurality of chambers, each of said plurality of plate shaped members aligned with a respective one of said plurality of clamping members;
- (c) a first reservoir mounted axially within a hollow interior of said bottom portion and configured to contain nitrogen;
- (d) a second reservoir mounted axially within said hollow interior of said bottom portion and configured to contain hydraulic oil;
- (e) a linear generator mounted above said first and second reservoirs in a first chamber defined by a pair of said plate members, said linear generator including:
  - i. a generator housing,
  - ii. a generator shaft centrally disposed within said generator housing, said generator shaft having one end portion thereof extending outwardly from one end of said generator housing,
  - iii. a first pair of bearings secured inwardly from one end of said generator housing,
  - iv. a second pair of bearings secured inwardly from one end of said generator housing,
  - v. a pair of collars, each of said pair of collars secured to an outer surface of said generator shaft in operative alignment with a respective pair of bearings,
  - vi. a first annular gap formed between an inner peripheral surface of said each bearing and an outer peripheral surface of a respective collar;
  - vii. an annular coil stack mounted within a hollow interior of said generator housing mediate said first and second pair of bearings,
  - viii. a plurality of annular permanent magnets secured in series on an outer surface of said shaft between said pair of collars, and
  - ix. a second annular gap formed between an inner peripheral surface of said coil stack and an outer peripheral surface of said magnets;
- (f) a turbine assembly including:
  - i. a hollow turbine housing mounted on another one of said plurality of plate members,
  - ii. a hydro-kinetic turbine mounted within said turbine housing above said linear generator,
  - iii. a plurality of jets defined within said hydro-kinetic turbine, and
  - iv. a turbine shaft having one end thereof extending downwardly from one end of said turbine housing;
- (g) a first coupling connecting one end of said generator shaft with one end of said turbine shaft;
- (h) a bearing disposed on said turbine shaft in a spaced apart relationship with said first coupling;
- (i) a funnel shaped housing encasing said first coupling and said bearing, said funnel shaped housing having a wider open end thereof attached to a surface of one plate shaped member, positioned in close proximity to an upper end of the linear generator;
- (j) a support frame;
- (k) a gearbox suspended from said support frame;
- (l) a first pump supported on said support frame;
- (m) a second pump positioned axially between said generator and said turbine; and
- (n) a fluid conduit assembly including:
  - i. a first conduit connecting said first reservoir with said turbine assembly,
  - ii. a first control valve operatively mounted within said first conduit, whereby a hydraulic fluid is supplied to said turbine assembly,
  - iii. a first filter mounted within said first conduit;
  - iv. a first solenoid operable check valve mounted intermediate said first control valve and said first reservoir,
  - v. a second conduit connecting said second reservoir with an inlet in each of said first and second pumps,
  - vi. a second control valve operatively mounted within said second conduit,
  - vii. a third conduit connecting said second chamber with an inlet in each of said first and second pumps,
  - viii. a suction member attached to an end of said third conduit disposed within said second chamber,
  - ix. a solenoid operated valve mounted within said third conduit and connected to a controller,
  - x. a pair of filters mounted in a spaced apart relationship with each other within said third conduit,
  - xi. a fourth conduit connecting outlet of said first pump with said first reservoir,
  - xii. a third solenoid operable valve mounted in said fourth conduit in close proximity to said first reservoir,
  - xiii. a fourth solenoid operable valve mounted in said fourth conduit within said second chamber,
  - xiv. a fifth conduit connecting outlet of said first pump with said second reservoir,
  - xv. a first hose configured to connect said first reservoir to external supply of hydraulic fluid,
  - xvi. a second hose configured to connect said second reservoir to external supply of nitrogen gas,
  - xvii. a first pressure gage positioned external said housing and configured to display pressure within said first reservoir,
  - xxiii. a first pressure relief valve mounted intermediate said first pressure gage and said first reservoir,
  - xix. a sixth conduit connecting an outlet of said second pump with said fourth conduit,
  - xx. a filter mounted within said sixth conduit,
  - xxi. a second pressure gage positioned external said housing and connected to said sixth conduit, said second pressure gage configured to display pressure of hydraulic fluid exiting said second pump,
  - xxii. a second pressure relief valve mounted intermediate said second pressure gage and said second pump, and
  - xxiii. a seventh conduit connecting said first conduit with said fourth conduit in proximity to said first reservoir; and
- (o) a control assembly including:
  - i. high density electric storage capacitor,
  - ii. an enclosure,
  - iii. a receptacle within said enclosure to a source of electric energy supply,
  - iv. a software control panel mounted within said enclosure, v. a voltage controller regulator mounted within said enclosure, and
vi. electrical connection between said receptacle and said gearbox.

* * * * *